United States Patent
Noh et al.

(10) Patent No.: US 10,743,189 B2
(45) Date of Patent: Aug. 11, 2020

(54) METHOD, DEVICE, AND SYSTEM FOR TRANSMITTING SIGNALS IN UNLICENSED BAND

(71) Applicant: WILUS INSTITUTE OF STANDARDS AND TECHNOLOGY INC., Gyeonggi-do (KR)

(72) Inventors: Minseok Noh, Seoul (KR); Jinsam Kwak, Gyeonggi-do (KR); Juhyung Son, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 16/525,453

(22) Filed: Jul. 29, 2019

(65) Prior Publication Data

US 2019/0349777 A1 Nov. 14, 2019

Related U.S. Application Data

(63) Continuation of application No. 15/968,695, filed on May 1, 2018, now Pat. No. 10,412,593, which is a
(Continued)

(30) Foreign Application Priority Data

Nov. 5, 2015 (KR) .................. 10-2015-0155267
Nov. 13, 2015 (KR) .................. 10-2015-0159842

(51) Int. Cl.
*H04L 27/26* (2006.01)
*H04W 16/14* (2009.01)
(Continued)

(52) U.S. Cl.
CPC ............. *H04W 16/14* (2013.01); *H04L 5/005* (2013.01); *H04L 5/0051* (2013.01);
(Continued)

(58) Field of Classification Search
CPC ..... H04L 27/261; H04L 5/005; H04L 5/0053; H04W 16/14

See application file for complete search history.

(56) References Cited

U.S. PATENT DOCUMENTS

2014/0112289 A1 4/2014 Kim et al.
2014/0126402 A1 5/2014 Nam et al.
(Continued)

FOREIGN PATENT DOCUMENTS

WO 2015/147593 10/2015
WO 2017/078503 5/2017

OTHER PUBLICATIONS

International Search Report for PCT/KR2016/012755 dated Feb. 27, 2017 and its English translation from WIPO (published as WO 2017/078503).
(Continued)

*Primary Examiner* — Said M Elnoubi
(74) *Attorney, Agent, or Firm* — Ladas & Parry, LLP

(57) ABSTRACT

A method, device, and system for receiving a downlink signal is provided. The method includes: detecting a Channel State Information Reference Signal (CSI-RS) in a time unit #n on an unlicensed band cell; verifying whether the CSI-RS is used for Discovery RS (DRS) using an initialization value of a CSI-RS sequence of the CSI-RS; and performing a Radio Resource Management (RRM) measurement when the CSI-RS is used for the DRS. The CSI-RS is used for the DRS when an index of the time unit #n is not used for the initialization value of the CSI-RS sequence.

20 Claims, 24 Drawing Sheets

Related U.S. Application Data continuation of application No. PCT/KR2016/012755, filed on Nov. 7, 2016.

(51) Int. Cl.

| | |
|---|---|
| *H04L 5/00* | (2006.01) |
| *H04L 27/00* | (2006.01) |
| *H04W 74/08* | (2009.01) |
| *H04W 24/08* | (2009.01) |
| *H04W 84/04* | (2009.01) |

(52) U.S. Cl.
CPC ........ *H04L 5/0053* (2013.01); *H04L 27/0006* (2013.01); *H04L 27/261* (2013.01); *H04L 5/001* (2013.01); *H04W 24/08* (2013.01); *H04W 74/0808* (2013.01); *H04W 84/042* (2013.01)

(56) References Cited

U.S. PATENT DOCUMENTS

| | | |
|---|---|---|
| 2015/0155992 A1 | 6/2015 | Kim et al. |
| 2015/0245232 A1 | 8/2015 | Luo et al. |
| 2016/0073366 A1 | 3/2016 | Ng et al. |
| 2017/0064571 A1 | 3/2017 | Kusashima et al. |
| 2017/0280331 A1* | 9/2017 | Gou ................. H04W 72/0486 |
| 2018/0249339 A1 | 8/2018 | Noh et al. |

OTHER PUBLICATIONS

Written Opinion of the International Searching Authority for PCT/KR2016/012755 dated Feb. 27, 2017 and its English translation from WIPO (published as WO 2017/078503).

International Preliminary Report on Patentability (Chapter I) for PCT/KR2016/012755 dated May 8, 2018 and its English translation from WIPO (published as WO 2017/078503).

3GPP TS 36.211, $3^{rd}$ Generation Partnership Project; Technical Specification Group Radio Access Network; Evolved Universal Terrestrial Radio Access (E-UTRA); Physical channels and modulation (Release 12), Jun. 2015, 3GPP TS 36.211 V12.6.0, pp. 1-136.

Office Action for U.S. Appl. No. 15/968,695 dated Dec. 20, 2018 (published as US 2018-0249339 A1).

Notice of Allowance for U.S. Appl. No. 15/968,695 dated Apr. 29, 2019 (published as US 2018-0249339 A1).

* cited by examiner (a) LAA DL transmission burst starting with a regular subframe (b) LAA DL transmission burst starting with a partial subframe

METHOD, DEVICE, AND SYSTEM FOR TRANSMITTING SIGNALS IN UNLICENSED BAND

TECHNICAL FIELD

The present invention relates to a wireless communication system. Specifically, the present invention relates to a method, device, and system for performing transmission or reception of a signal in an unlicensed band.

BACKGROUND ART

In recent years, with an explosive increase of mobile traffic due to the spread of smart devices, it has been difficult to cope with data usage which increases for providing a cellular communication service only by a conventional licensed frequency spectrum or LTE-licensed frequency band.

In such a situation, a scheme that uses an unlicensed (alternatively, unauthorized, non-licensed, or license unnecessary) frequency spectrum or LTE-Unlicensed frequency band (e.g., 2.4 GHz band, 5 GHz band, or the like) for providing the cellular communication service has been devised as a solution for a spectrum shortage problem.

However, unlike the licensed band in which a communication service provider secures an exclusive frequency use right through a procedure such as auction, or the like, in the unlicensed band, multiple communication facilities can be used simultaneously without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., wireless LAN device) using the unlicensed band may occur.

Therefore, a research into a coexistence scheme with the conventional unlicensed band device and a scheme for efficiently sharing a radio channel needs to be preferentially made in order to settle an LTE technology in the unlicensed band. That is, a robust coexistence mechanism (RCM) needs to be developed in order to prevent a device using the LTE technology in the unlicensed band from influencing the conventional unlicensed band device.

DISCLOSURE

Technical Problem

The present invention has been made in an effort to provide a method for efficiently transmitting/receiving a signal in a wireless communication system, in particular, a cellular wireless communication system and an apparatus therefor. Further, the present invention has been made in an effort to provide a method for efficiently transmitting/receiving a signal in a specific frequency band (e.g., unlicensed band) and an apparatus therefor.

Technical objects desired to be achieved in the present invention are not limited to the aforementioned objects, and other technical objects not described above will be apparently understood by those skilled in the art from the following disclosure.

Technical Solution

According to an embodiment of the present invention, a method of a base station to transmit a downlink signal in a cellular communication system includes: selecting Channel State Information Reference Signal (CSI-RS) configuration information for a downlink cell from a CSI-RS configuration information set; transmitting the selected CSI-RS configuration information to a user equipment; and transmitting CSI-RS to the user equipment in the downlink cell according to the selected CSI-RS configuration information, wherein each CSI-RS configuration information represents Orthogonal Frequency Division Multiplexing (OFDM) symbols for CSI-RS in a subframe including OFDM symbols #0 to #13, wherein when the downlink cell operates in a licensed band, the CSI-RS configuration information set is a first CSI-RS configuration information set including one or more first CSI-RS configuration information related to OFDM symbols #5/#6, one or more second CSI-RS configuration information related to OFDM symbols #9/#10, and one or more third CSI-RS configuration information related to OFDM symbols #12/#13, wherein when the downlink cell operates in an unlicensed band, the CSI-RS configuration information set is a second CSI-RS configuration information set, wherein the second CSI-RS configuration information set is part of the first CSI-RS configuration set and does not include the one or more third CSI-RS configuration information.

According to another embodiment of the present invention, a base station used in a cellular wireless communication system includes: a wireless communication module; and a processor, wherein the processor is configured to select Channel State Information Reference Signal (CSI-RS) configuration information for a downlink cell from a CSI-RS configuration information set, transmit the selected CSI-RS configuration information to a user equipment, and transmit CSI-RS to the user equipment in the downlink cell according to the selected CSI-RS configuration information, wherein each CSI-RS configuration information represents Orthogonal Frequency Division Multiplexing (OFDM) symbols for CSI-RS in a subframe including OFDM symbols #0 to #13, wherein when the downlink cell operates in a licensed band, the CSI-RS configuration information set is a first CSI-RS configuration information set including one or more first CSI-RS configuration information related to OFDM symbols #5/#6, one or more second CSI-RS configuration information related to OFDM symbols #9/#10, and one or more third CSI-RS configuration information related to OFDM symbols #12/#13, wherein when the downlink cell operates in an unlicensed band, the CSI-RS configuration information set is a second CSI-RS configuration information set, wherein the second CSI-RS configuration information set is part of the first CSI-RS configuration set and does not include the one or more third CSI-RS configuration information.

The second CSI-RS configuration information set may not include the one or more first CSI-RS configuration information.

The first CSI-RS configuration information set may be a CSI-RS configuration {0, 1, 2, 3, 4, 5, 6, 7, 8, 9, 10, 11, 12, 13, 14, 15, 16, 17, 18, 19} and the second CSI-RS configuration information set may be a CSI-RS configuration {1, 2, 3, 6, 7, 8, 12, 13, 14, 15, 16, 17}.

The OFDM symbols for CSI-RS according to a CSI-RS configuration is given by the following Table.

| CSI-RS configuration | Number of CSI reference signals configured | | |
|---|---|---|---|
| | 1 or 2 OFDM symbol index | 4 OFDM symbol index | 8 OFDM symbol index |
| 0 | 5, 6 | 5, 6 | 5, 6 |
| 1 | 9, 10 | 9, 10 | 9, 10 |
| 2 | 9, 10 | 9, 10 | 9, 10 |
| 3 | 9, 10 | 9, 10 | 9, 10 |
| 4 | 12, 13 | 12, 13 | 12, 13 |
| 5 | 5, 6 | 5, 6 | |
| 6 | 9, 10 | 9, 10 | |
| 7 | 9, 10 | 9, 10 | |
| 8 | 9, 10 | 9, 10 | |
| 9 | 12, 13 | 12, 13 | |
| 10 | 5, 6 | | |
| 11 | 5, 6 | | |
| 12 | 9, 10 | | |
| 13 | 9, 10 | | |
| 14 | 9, 10 | | |
| 15 | 9, 10 | | |
| 16 | 9, 10 | | |
| 17 | 9, 10 | | |
| 18 | 12, 13 | | |
| 19 | 12, 13 | | |

The cellular communication system may be a 3rd Generation Partnership Project (3GPP) Long-term Evolution (LTE)-based communication system.

According to another embodiment of the present invention, a method of a user equipment to receive a downlink signal in a cellular communication system, the method including: detecting a Channel State Information Reference Signal (CSI-RS) in a time unit #n on an unlicensed band cell; verifying whether the CSI-RS may be used for Discovery RS (DRS) using an initialization value of a CSI-RS sequence of the CSI-RS; and performing a Radio Resource Management (RRM) measurement using the CSI-RS when the CSI-RS may be used for the DRS, wherein when an index of the time unit #n may be not used for the initialization value of the CSI-RS sequence, the CSI-RS may be used for the DRS.

According to another embodiment of the present invention, a user equipment used in a cellular wireless communication system, the user equipment comprising: a wireless communication module; and a processor, wherein the processor may be configured to detect a Channel State Information Reference Signal (CSI-RS) in a time unit #n on an unlicensed band cell, verify whether the CSI-RS may be used for Discovery RS (DRS) using an initialization value of a CSI-RS sequence of the CSI-RS and perform a Radio Resource Management (RRM) measurement using the CSI-RS when the CSI-RS may be used for the DRS, wherein when an index of the time unit #n may be not used for the initialization value of the CSI-RS sequence, the CSI-RS may be used for the DRS.

The time unit #n may be a subframe #n or a slot #n.

The time unit #n may be not a subframe #0 or #5, and when a slot index of the subframe #0 or #5 may be used for the initialization value of the CSI-RS sequence, the CSI-RS may be used for the DRS.

When the CSI-RS may be used for the DRS, the CSI-RS may be used for the CSI measurement and the Radio Resource Management (RRM) measurement.

The initialization value of the CSI-RS sequence may be given by the following Equation.

$$c_{init}=2^{10}\cdot(7\cdot(n_s+1)+l+1)\cdot(2\cdot N_{ID}^{CSI}+1)+2\cdot N_{ID}^{CSI}+N_{CP}$$

Here, l represents an OFDM symbol index within a slot, $N_{ID}^{CS}$ represents a value configured by higher layers or a physical cell identifier, $N_{CP}$ has 0 or 1 depending on a Cyclic Prefix (CP) type, and $n_s$ has an index of the time unit #n or has another predetermined value according to the use of a CSI-RS.

OFDM symbols indexes according to a CSI-RS configuration for the CSI-RS may be given by the following Table.

| CSI-RS configuration | Number of CSI reference signals configured | | |
|---|---|---|---|
| | 1 or 2 OFDM symbol index | 4 OFDM symbol index | 8 OFDM symbol index |
| 0 | 5, 6 | 5, 6 | 5, 6 |
| 1 | 9, 10 | 9, 10 | 9, 10 |
| 2 | 9, 10 | 9, 10 | 9, 10 |
| 3 | 9, 10 | 9, 10 | 9, 10 |
| 4 | 12, 13 | 12, 13 | 12, 13 |
| 5 | 5, 6 | 5, 6 | |
| 6 | 9, 10 | 9, 10 | |
| 7 | 9, 10 | 9, 10 | |
| 8 | 9, 10 | 9, 10 | |
| 9 | 12, 13 | 12, 13 | |
| 10 | 5, 6 | | |
| 11 | 5, 6 | | |
| 12 | 9, 10 | | |
| 13 | 9, 10 | | |
| 14 | 9, 10 | | |
| 15 | 9, 10 | | |
| 16 | 9, 10 | | |
| 17 | 9, 10 | | |
| 18 | 12, 13 | | |
| 19 | 12, 13 | | |

When the CSI-RS is used for the DRS, the CSI-RS configuration for the CSI-RS may be one of the CSI-RS configuration {1, 2, 3, 6, 7, 8, 12, 13, 14, 15, 16, 17} in the Table.

The cellular communication system is a 3rd Generation Partnership Project (3GPP) Long-term Evolution (LTE)-based communication system.

According to another embodiment of the present invention, a base station used in a cellular wireless communication system, the base station comprising: a wireless communication module; and a processor, wherein the processor is configured to transmit a Channel State Information Reference Signal (CSI-RS) to a user equipment using an initialization value of a CSI-RS sequence for the CSI-RS on an unlicensed band cell, wherein the initialization value of the CSI-RS sequence is not generated according to an index of a time unit #n when the CSI-RS is used for the DRS, wherein the CSI-RS is used for performing a Radio Resource Management (RRM) measurement on the user equipment.

The time unit #n may be a subframe #n or a slot #n.

The time unit #n may be not a subframe #0 or #5, and when a slot index of the subframe #0 or #5 may be used for the initialization value of the CSI-RS sequence, the CSI-RS may be used for the DRS.

When the CSI-RS may be used for the DRS, the CSI-RS may be used for the CSI measurement and the Radio Resource Management (RRM) measurement.

The initialization value of the CSI-RS sequence may be given by the following Equation.

$$c_{init}=2^{10}\cdot(7\cdot(n_s+1)+l+1)\cdot(2\cdot N_{ID}^{CSI}+1)+2\cdot N_{ID}^{CSI}+N_{CP}$$

Here, l represents an OFDM symbol index within a slot, $N_{ID}^{CS}$ represents a value configured by higher layers or a physical cell identifier, $N_{CP}$ has 0 or 1 depending on a Cyclic Prefix (CP) type, and $n_s$ has an index of the time unit #n or has another predetermined value according to the use of a CSI-RS.

OFDM symbols indexes according to a CSI-RS configuration for the CSI-RS may be given by the following Table.

| CSI-RS configuration | Number of CSI reference signals configured | | |
|---|---|---|---|
| | 1 or 2 OFDM symbol index | 4 OFDM symbol index | 8 OFDM symbol index |
| 0 | 5, 6 | 5, 6 | 5, 6 |
| 1 | 9, 10 | 9, 10 | 9, 10 |
| 2 | 9, 10 | 9, 10 | 9, 10 |
| 3 | 9, 10 | 9, 10 | 9, 10 |
| 4 | 12, 13 | 12, 13 | 12, 13 |
| 5 | 5, 6 | 5, 6 | |
| 6 | 9, 10 | 9, 10 | |
| 7 | 9, 10 | 9, 10 | |
| 8 | 9, 10 | 9, 10 | |
| 9 | 12, 13 | 12, 13 | |
| 10 | 5, 6 | | |
| 11 | 5, 6 | | |
| 12 | 9, 10 | | |
| 13 | 9, 10 | | |
| 14 | 9, 10 | | |
| 15 | 9, 10 | | |
| 16 | 9, 10 | | |
| 17 | 9, 10 | | |
| 18 | 12, 13 | | |
| 19 | 12, 13 | | |

Advantageous Effects

According to exemplary embodiments of the present invention, provided are a method for efficiently transmitting/receiving a signal in a wireless communication system, in particular, a cellular wireless communication system and an apparatus therefor. Further, provided are a method for efficiently transmitting/receiving a signal in a specific frequency band (e.g., unlicensed band) and an apparatus therefor.

Effects to be acquired in the present invention are not limited to the aforementioned effects, and other effects not described above will be apparently understood by those skilled in the art from the following disclosure.

BRIEF DESCRIPTION OF THE DRAWINGS

In order to help understand the present invention, the accompanying drawings which are included as a part of the Detailed Description provide embodiments of the present invention and describe the technical matters of the present invention together with the

DETAILED DESCRIPTION

Figure 1:
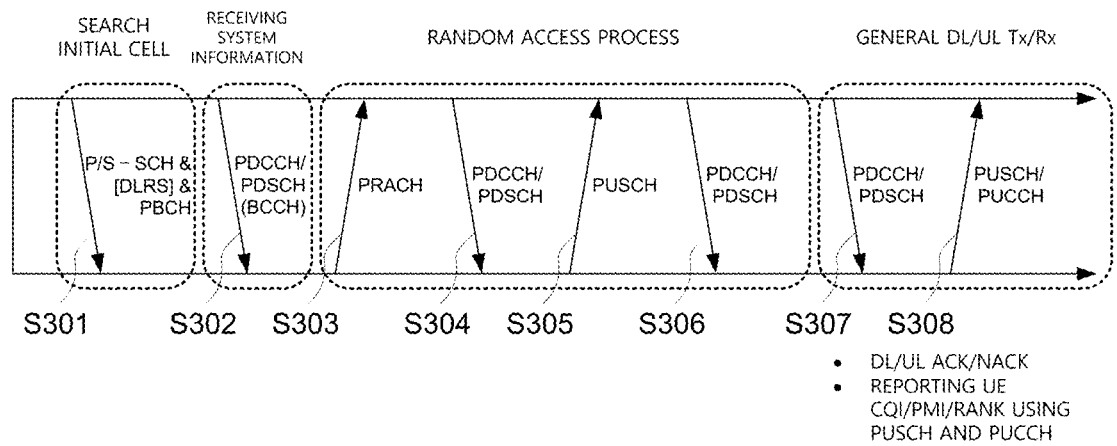

FIG. 1 illustrates physical channels used in a 3rd generation partnership project (3GPP) system and a general signal transmitting method using the physical channels.

Figure 2:
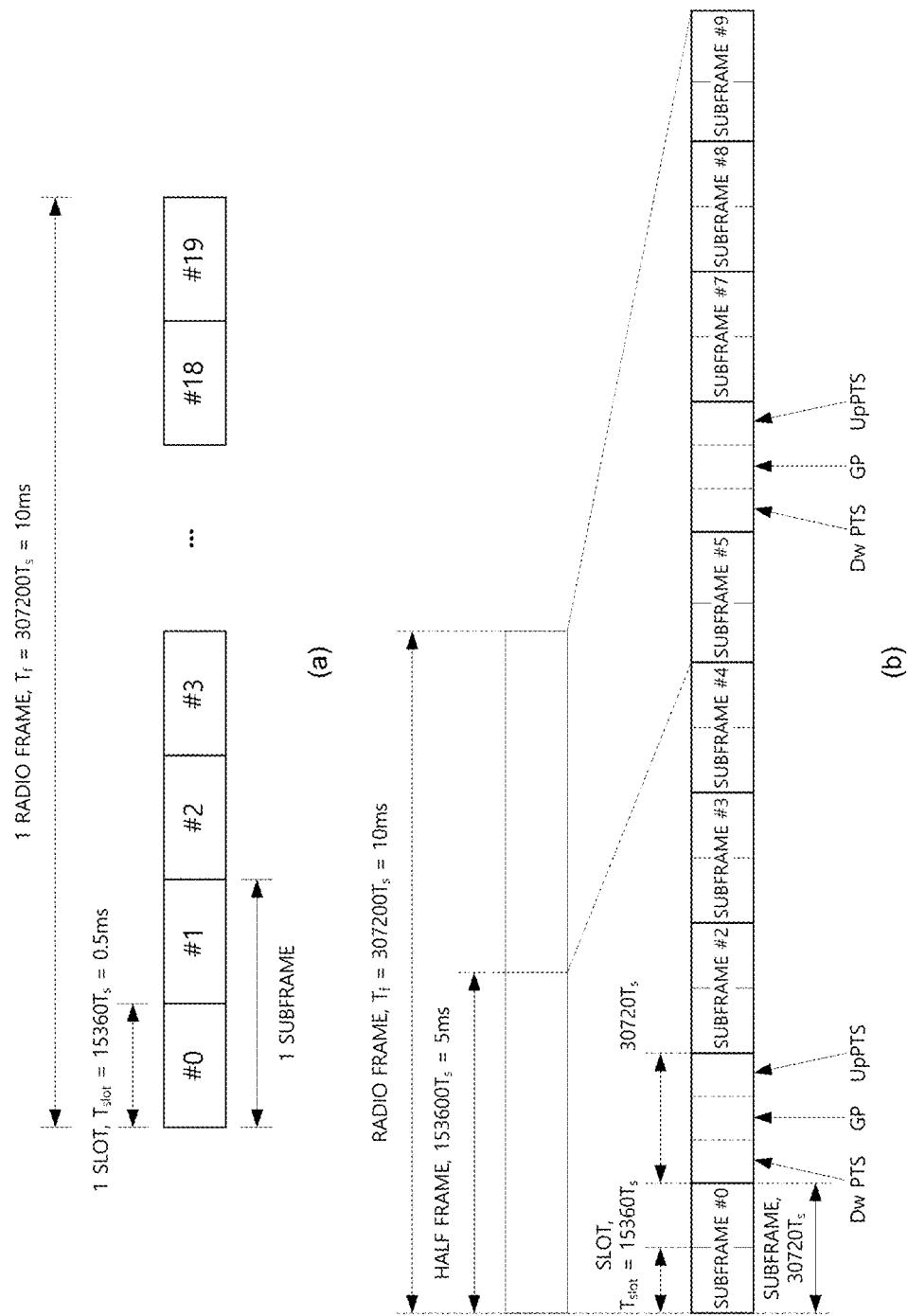

FIG. 2 illustrates one example of a radio frame structure used in a wireless communication system.

Figure 3:
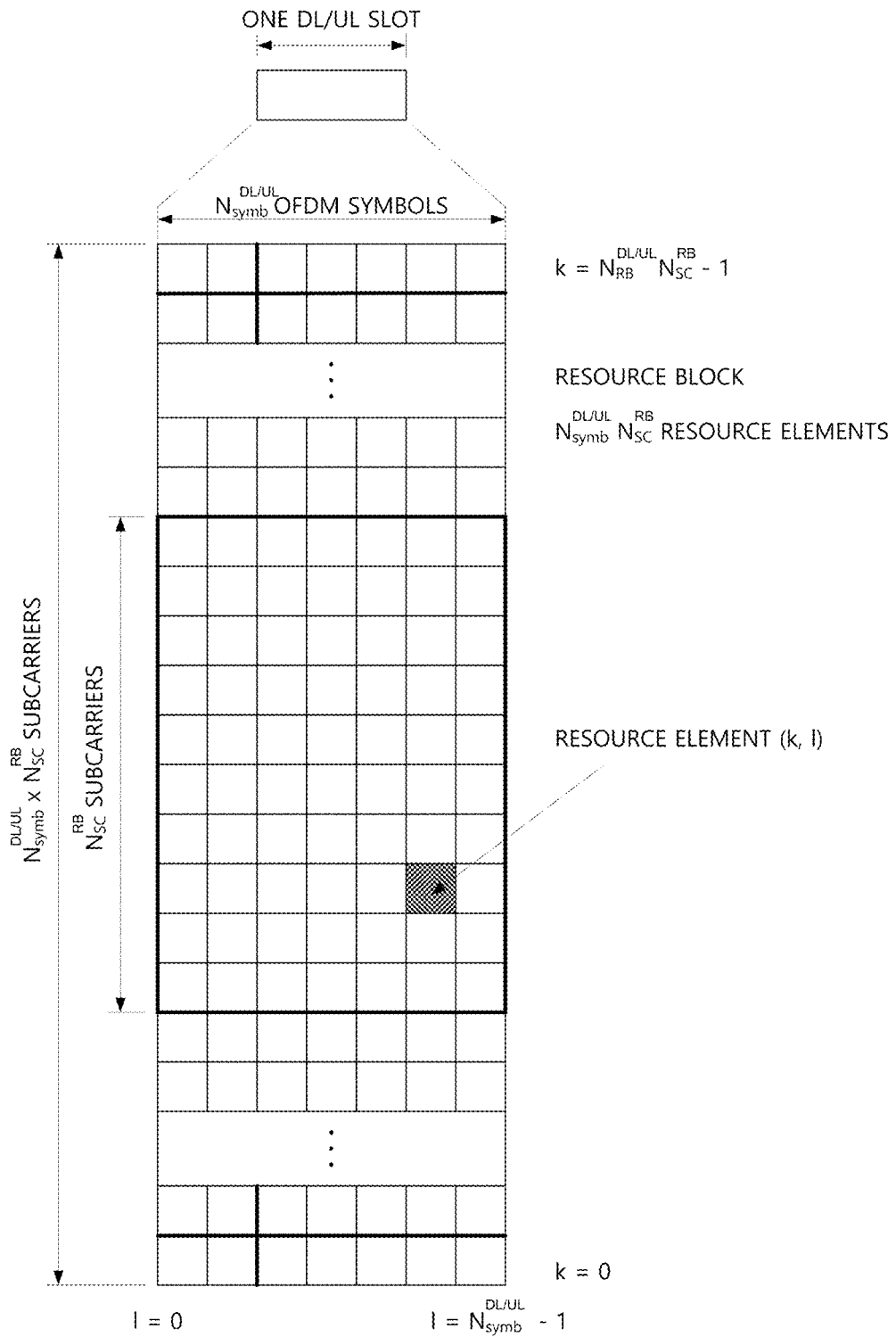

FIG. 3 illustrates one example of a downlink (DL)/uplink (UL) slot structure in the wireless communication system.

Figure 4:
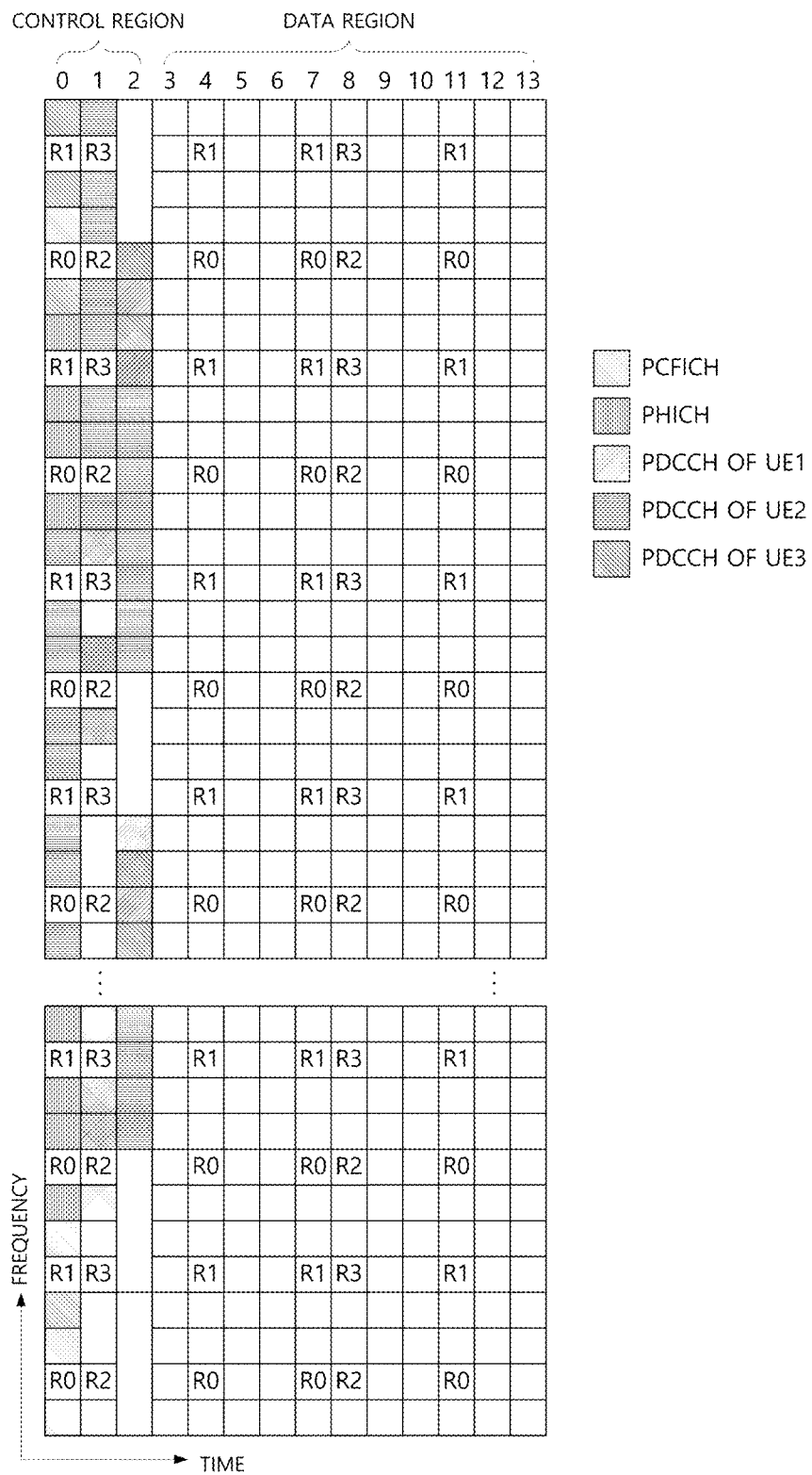

FIG. 4 illustrates a structure of a downlink subframe (SF).

Figure 5:
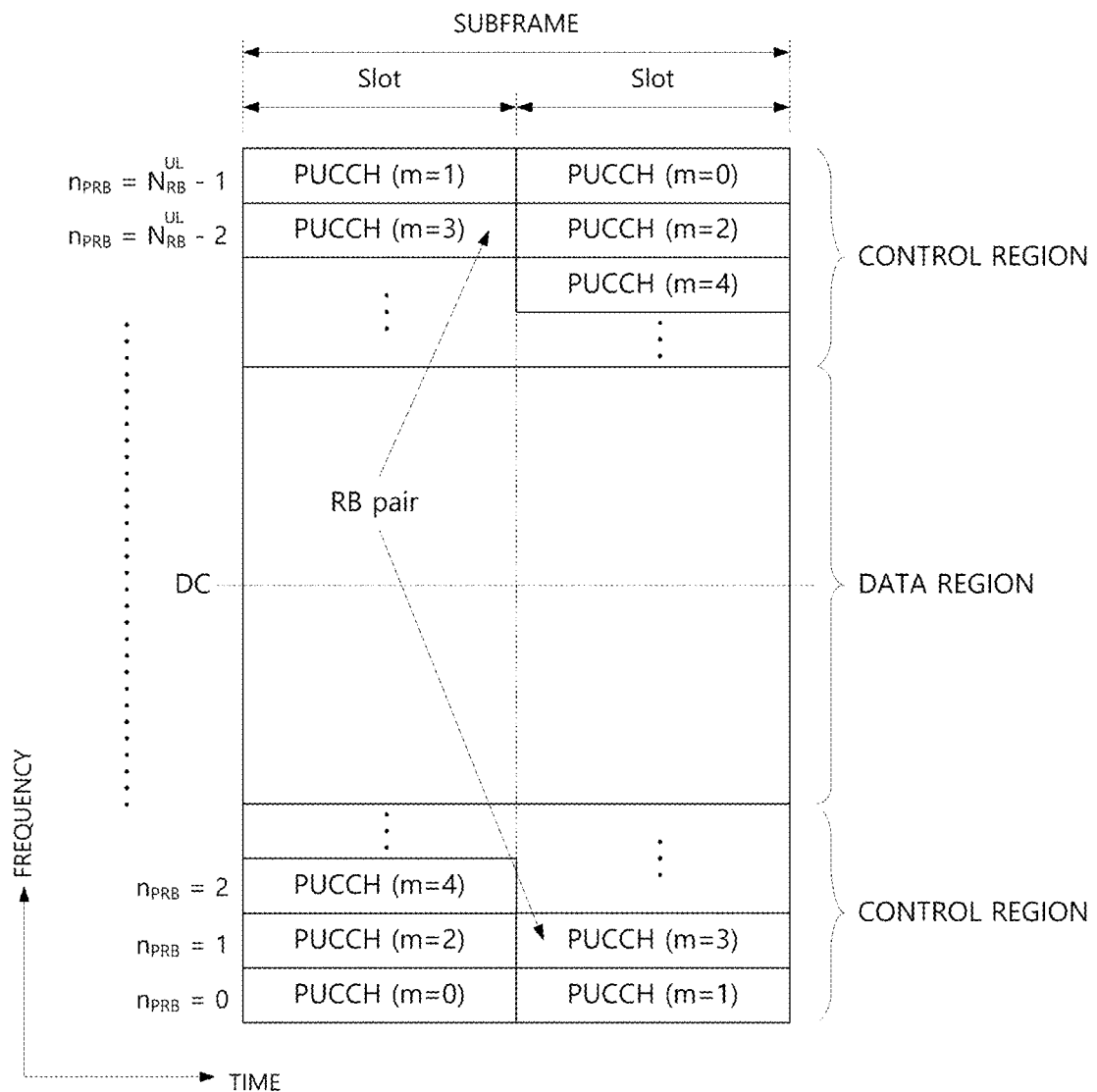

FIG. 5 illustrates a structure of an uplink subframe.

Figure 6:
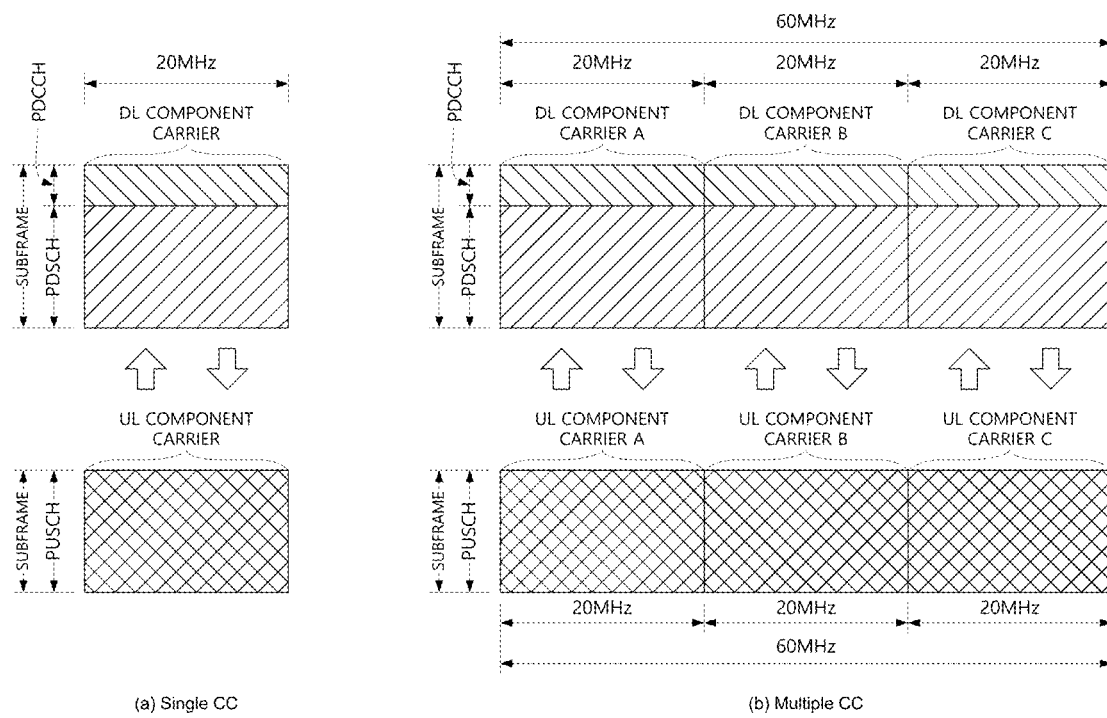

FIG. 6 is a diagram for describing single carrier communication and multi-carrier communication.

Figure 7:
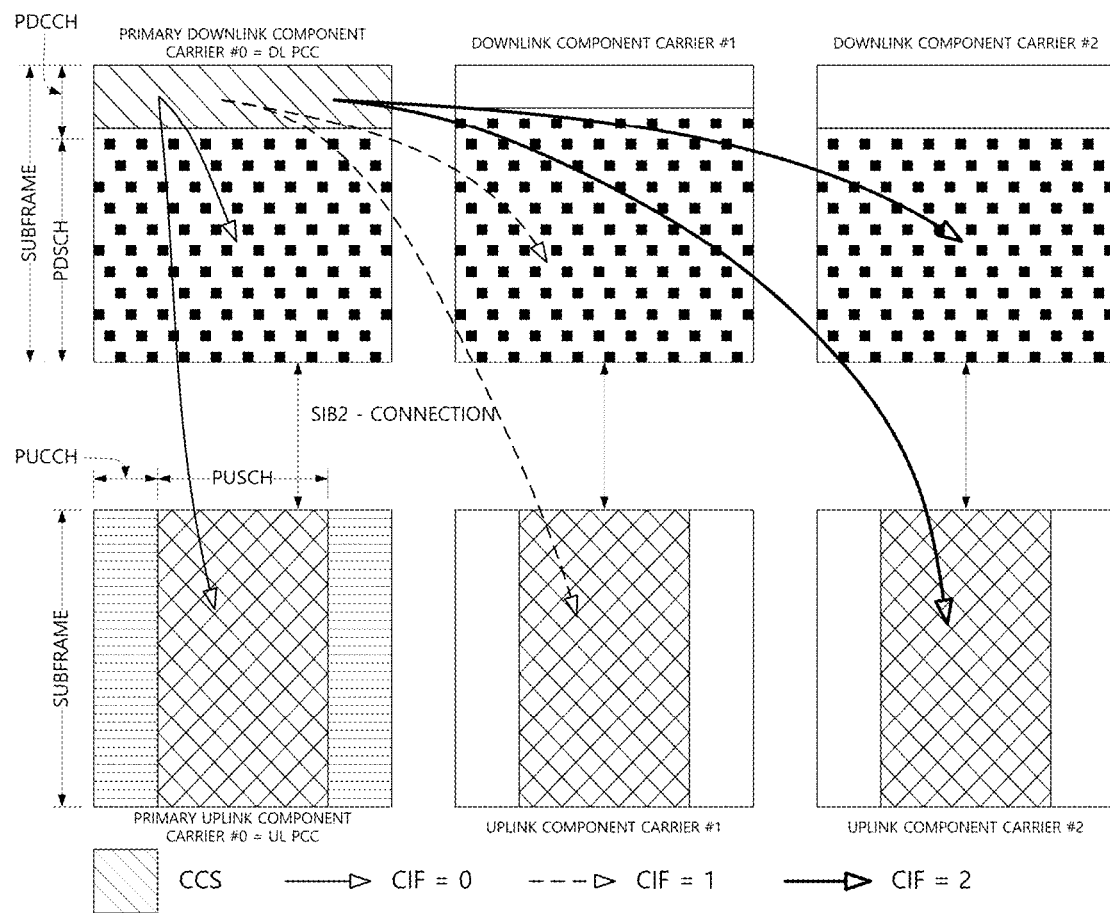

FIG. 7 illustrates an example in which a cross carrier scheduling technique is applied.

Figure 8:
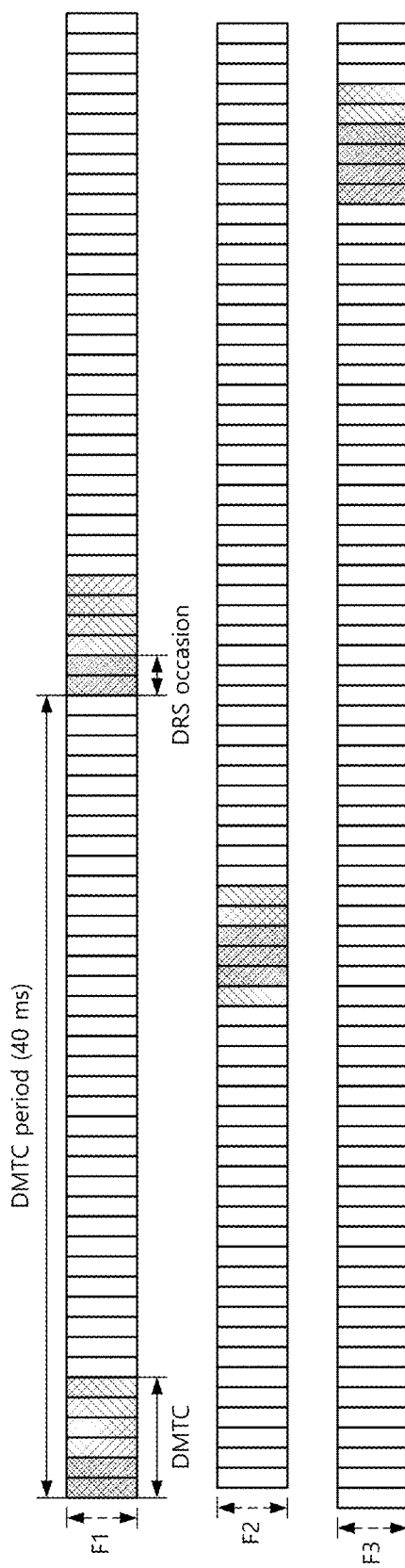

FIG. 8 illustrates Discovery Reference Signal (DRS) transmission.

Figure 9:
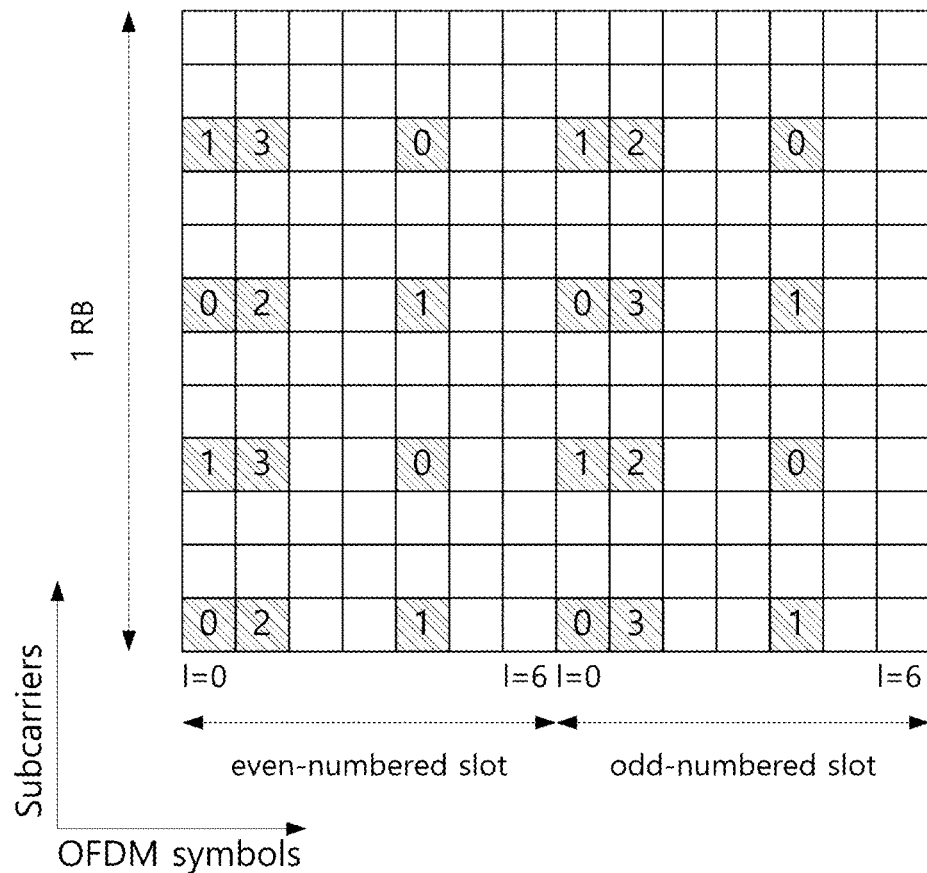
Figure 10:
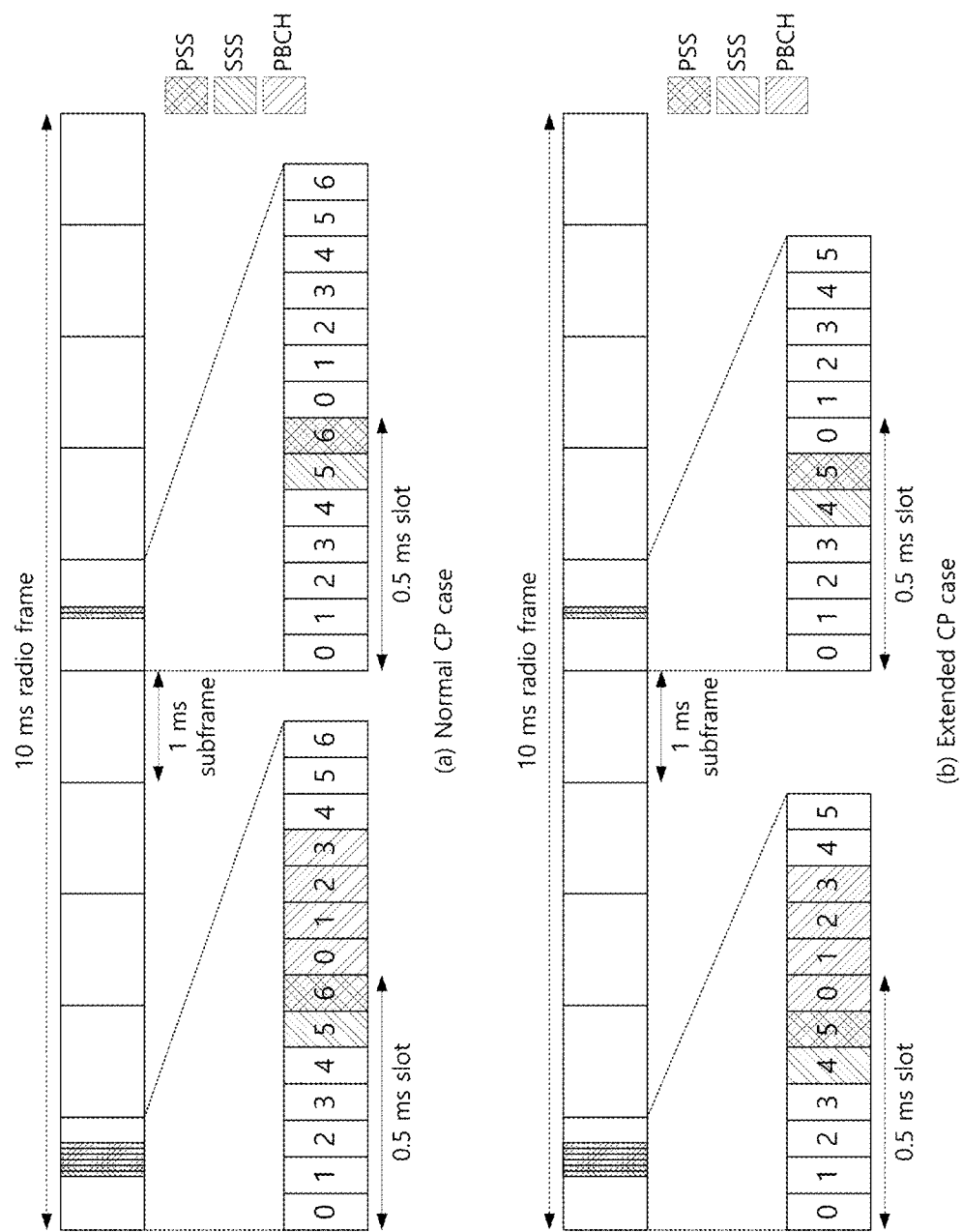
Figure 11:
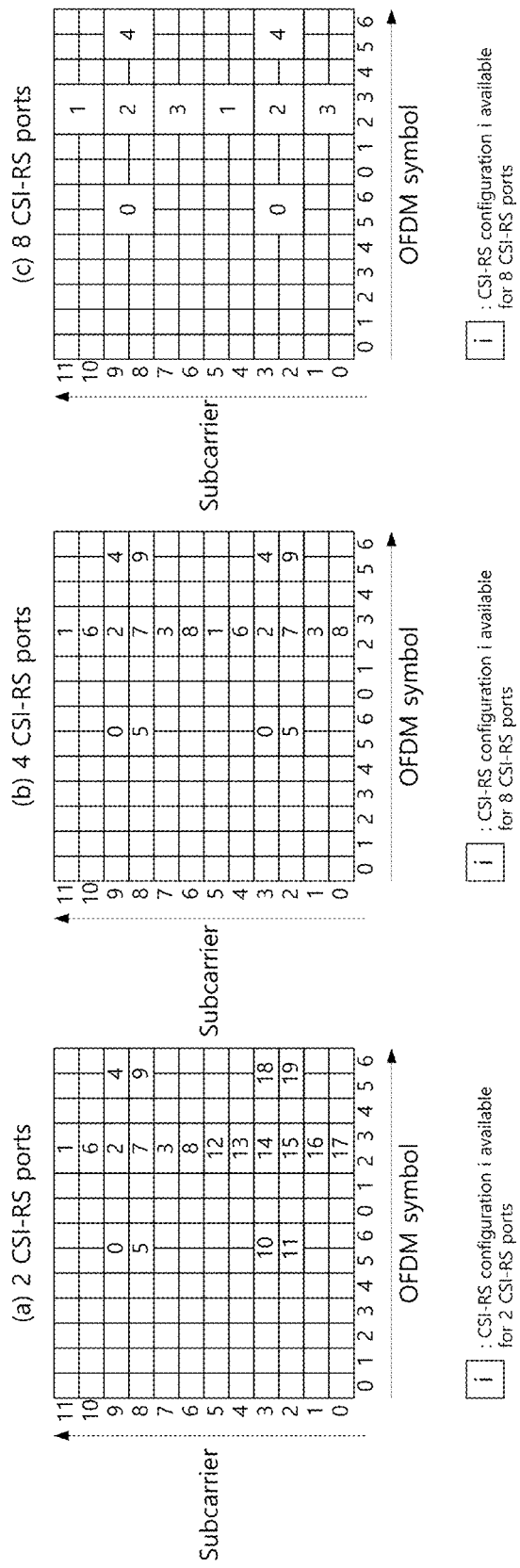

FIGS. 9 to 11 illustrate the structure of a reference signal used as DRS.

Figure 12:
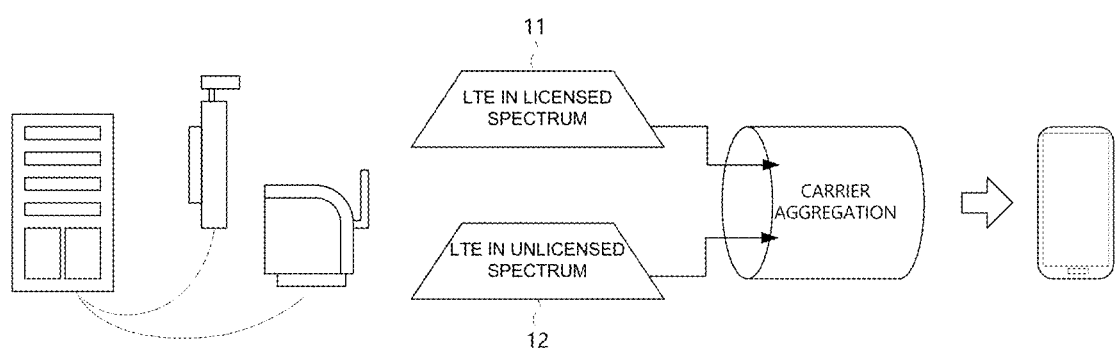

FIG. 12 illustrates a Licensed Assisted Access (LAA) service environment.

Figure 13:
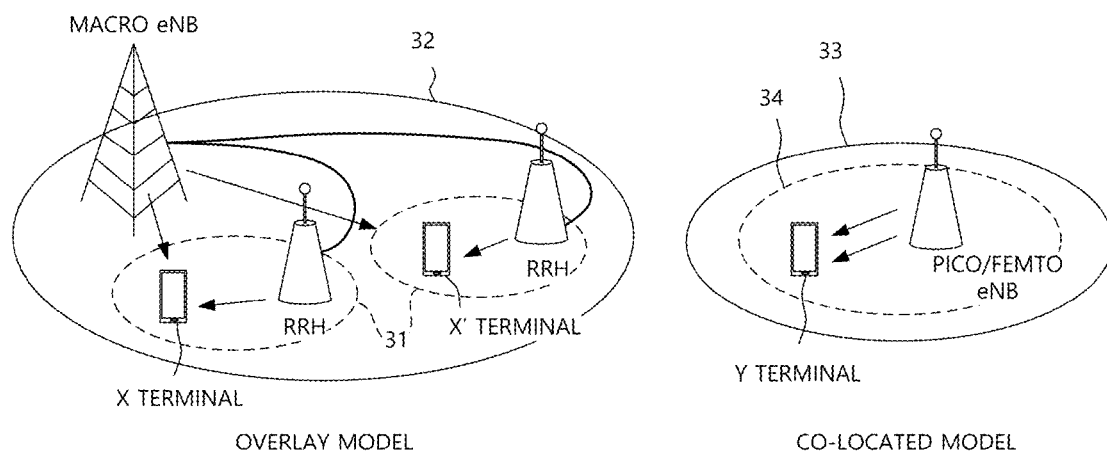

FIG. 13 illustrates a deployment scenario of a user equipment and a base station in an LAA service environment.

Figure 14:
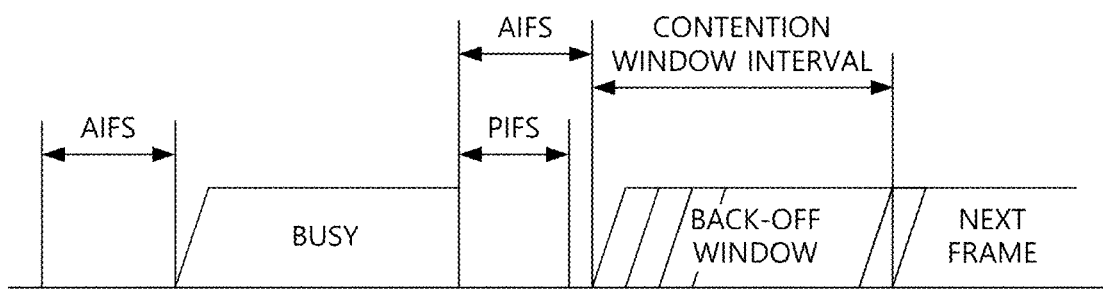

FIG. 14 illustrates a conventional communication scheme operating in an unlicensed band.

Figure 15:
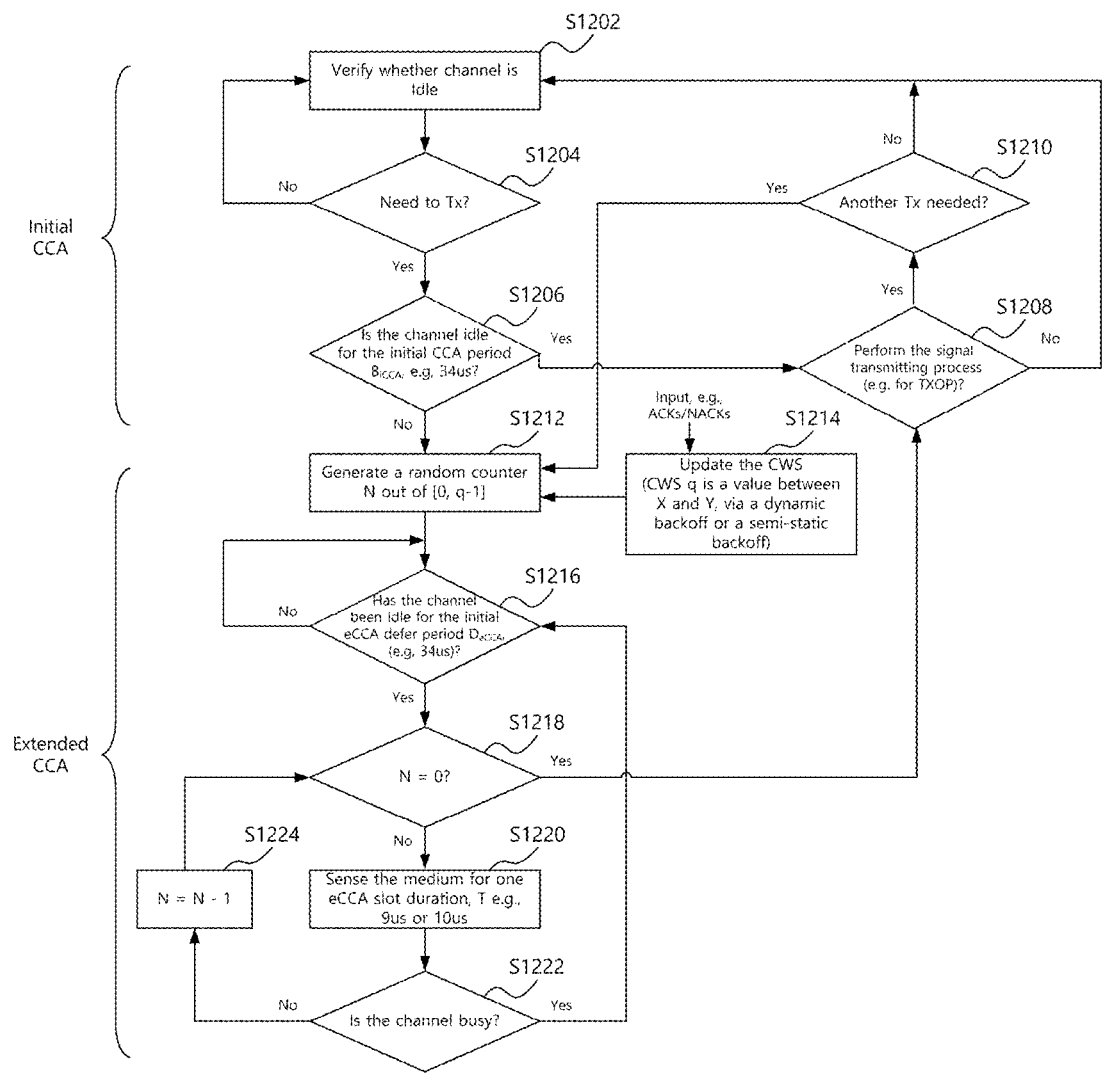
Figure 16:
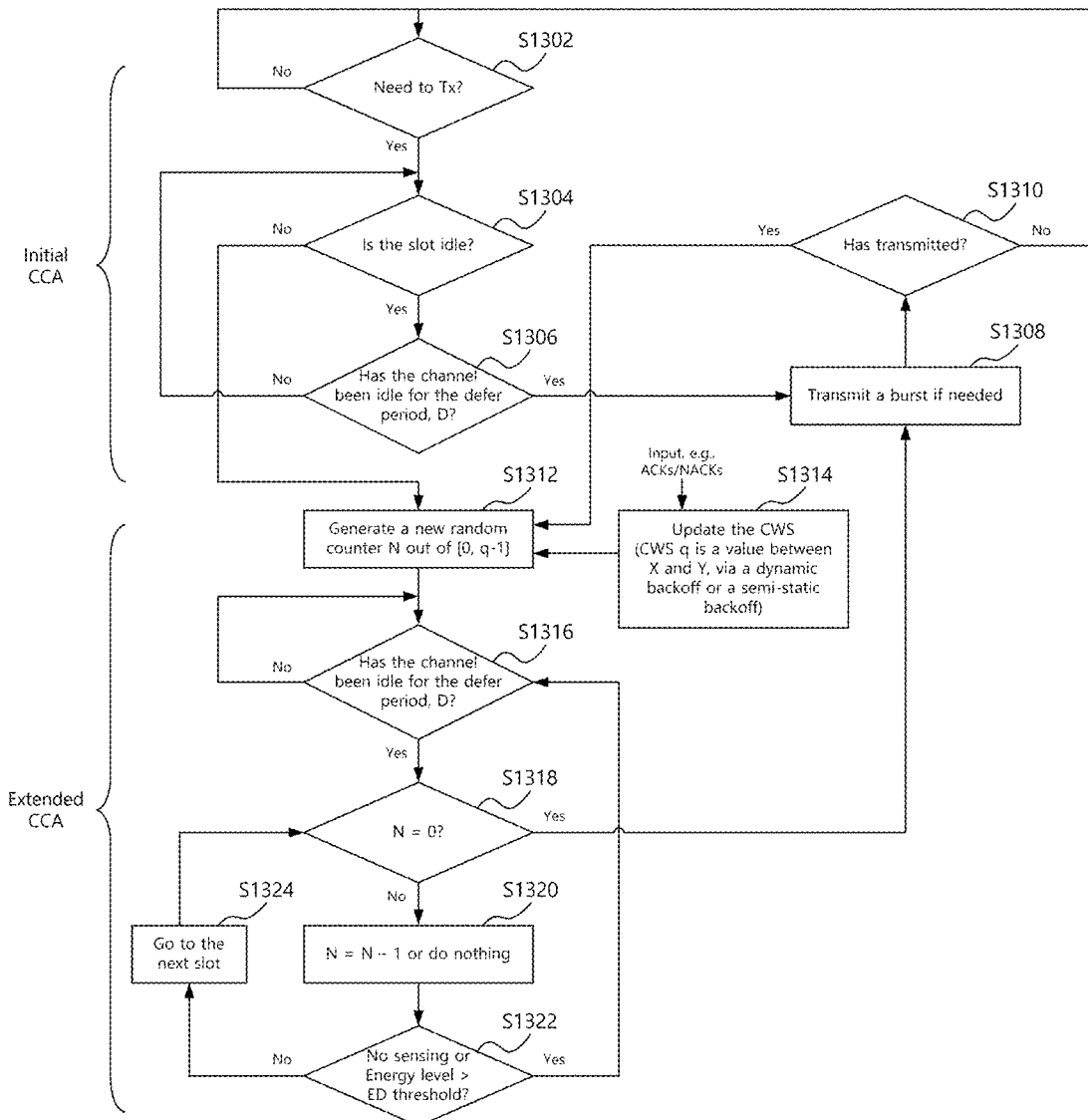

FIGS. 15 to 16 illustrate a Listen-Before-Talk (LBT) procedure for DL transmission.

Figure 17:
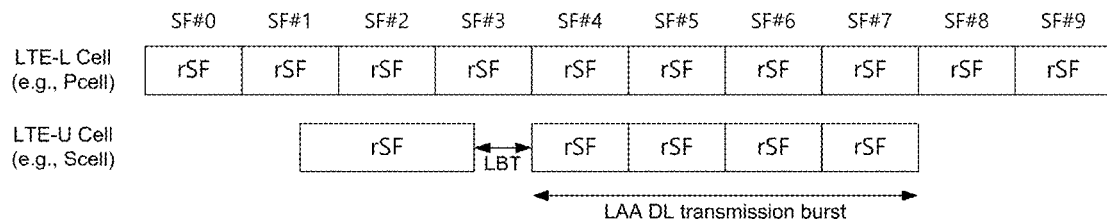
Figure 17:
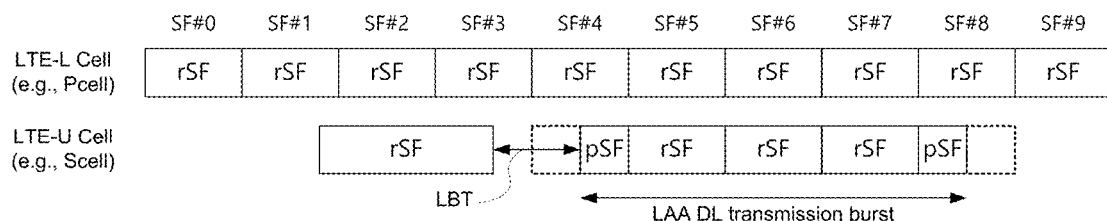

FIG. 17 illustrates DL transmission in unlicensed band.

Figure 18:
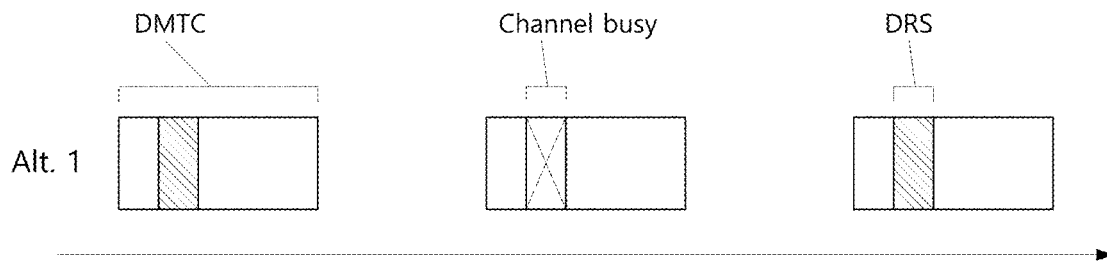
Figure 18:
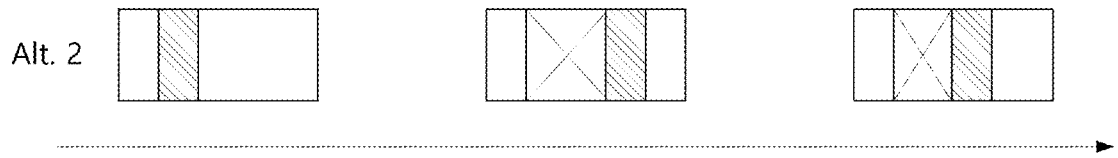

FIG. 18 illustrates DRS transmission in unlicensed band.

Figure 19:
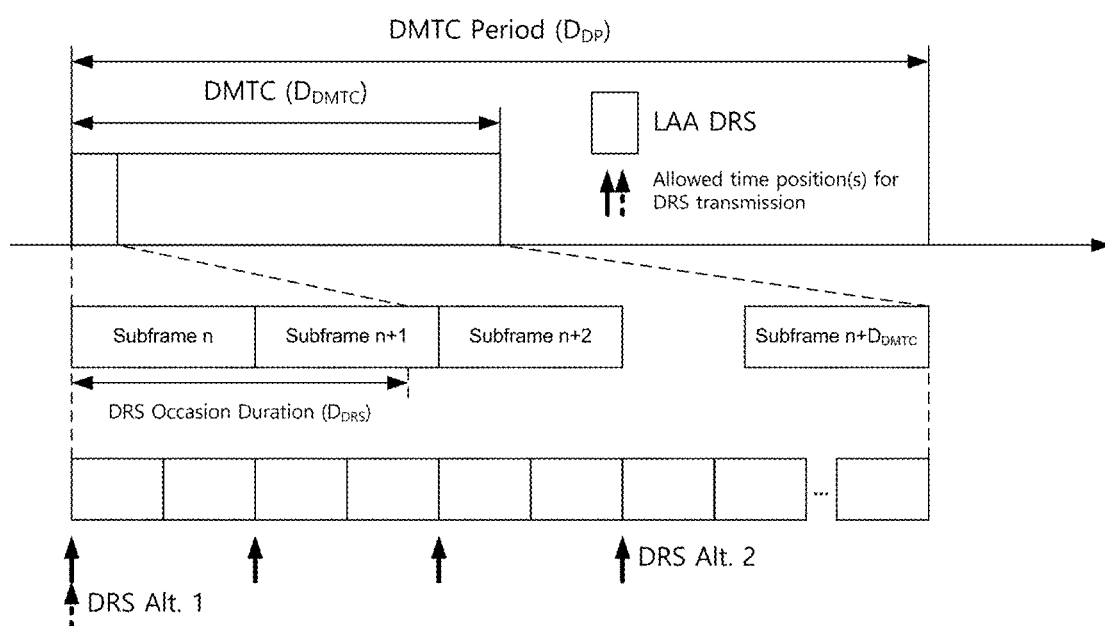

FIG. 19 illustrates a parameter for LAA DRS transmission and a DRS transmission method based on LBT.

Figure 20:
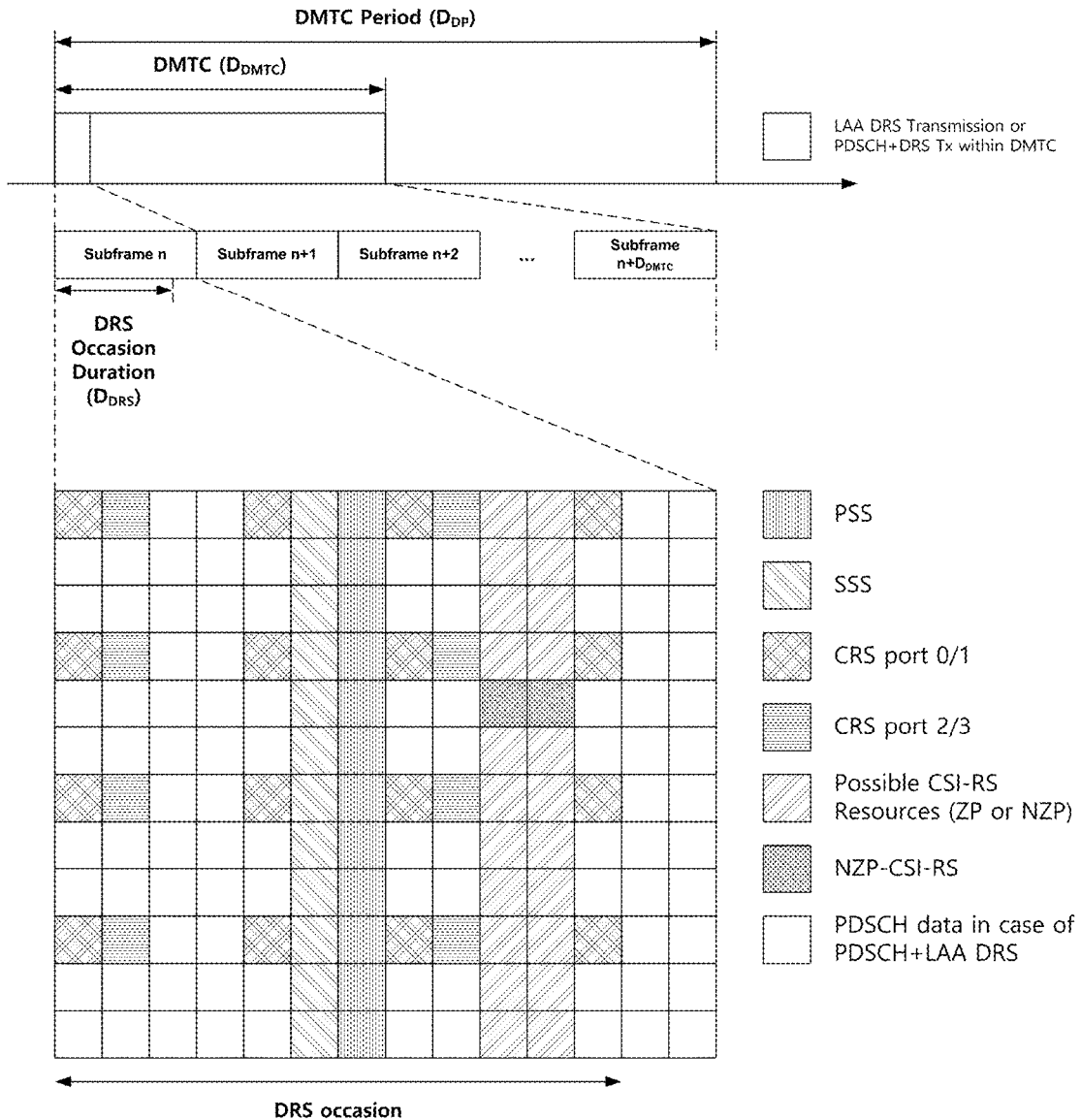
Figure 21:
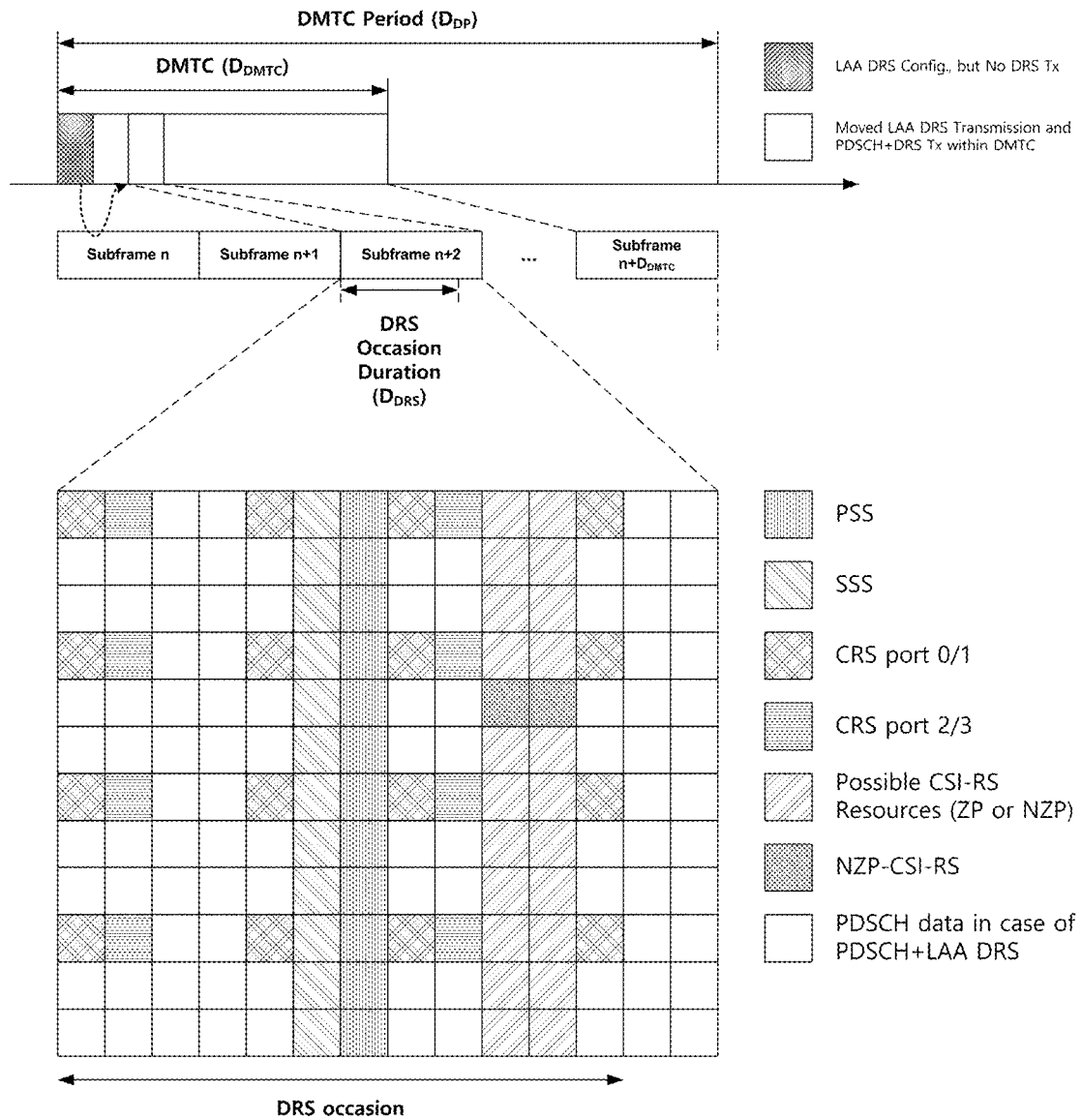

FIGS. 20 and 21 illustrate LAA DRS+PDSCH simultaneous transmission in DMTC.

Figure 22:
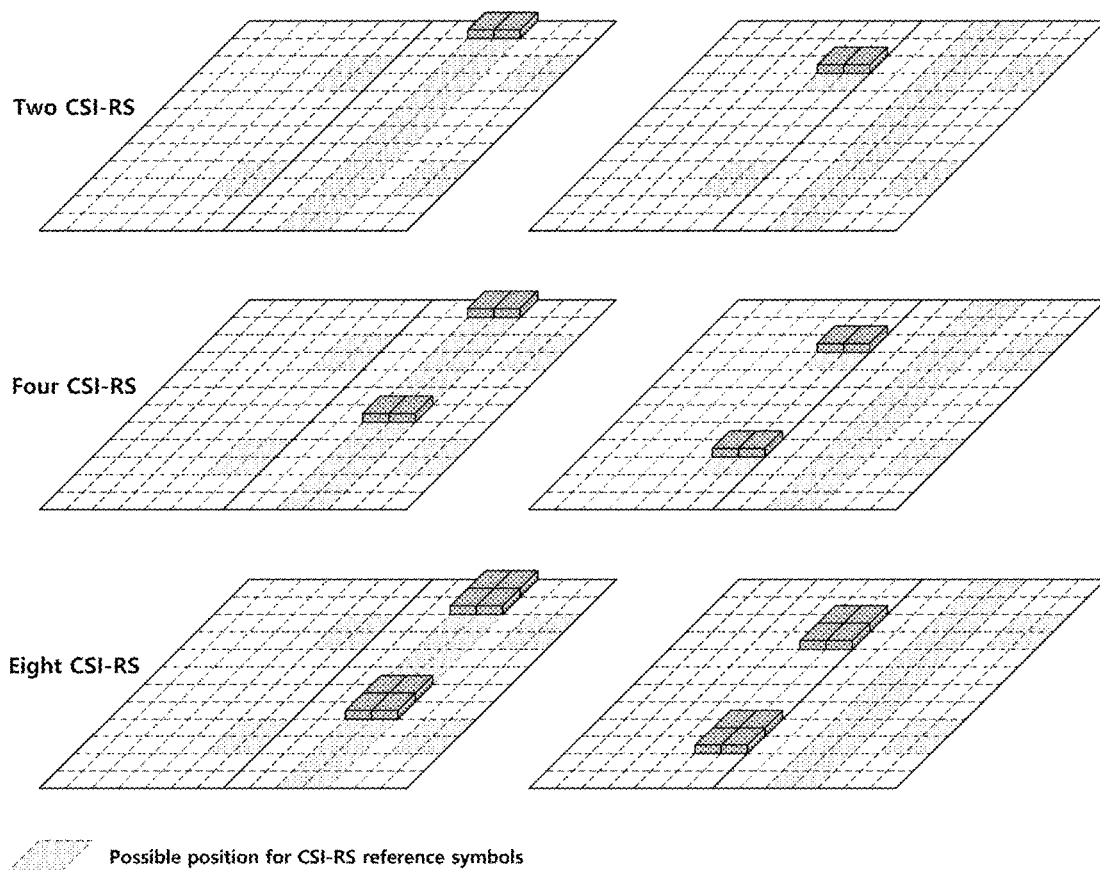

FIG. 22 illustrates an existing Secondary Synchronization Signal (SSS).

FIG. 22 illustrates a CSI-RS Resource Element (RE) according to a CSI-RS configuration.

Figure 23:
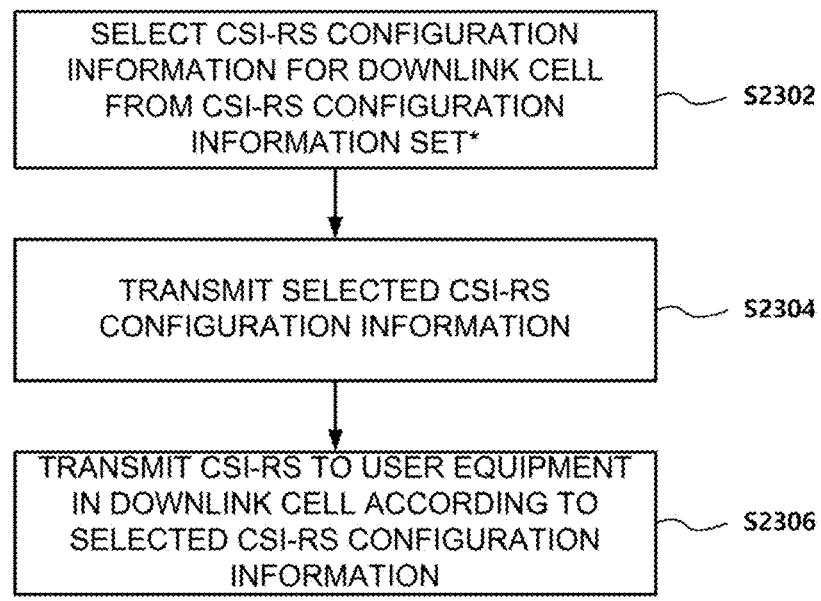

FIG. 23 illustrates a CSI-RS transmitting process according to an embodiment of the present invention.

Figure 24:
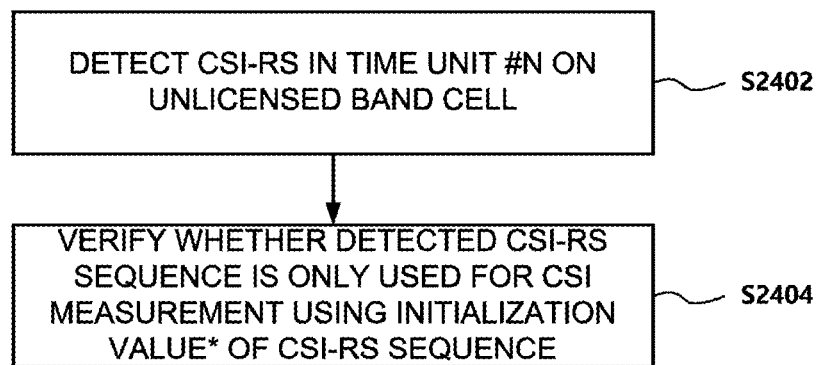

FIG. 24 illustrates a CSI-RS receiving process according to another embodiment of the present invention.

Figure 25:
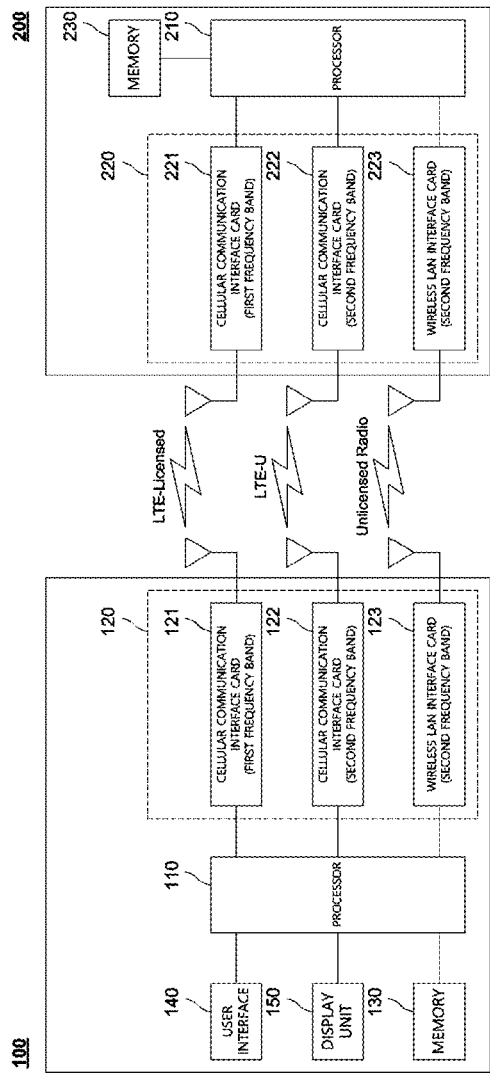

FIG. 25 illustrates a configuration of a user equipment and a base station according to an embodiment of the present invention.

MODE FOR CARRYING OUT THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "equal to or more than" or "equal to or less than" based on a specific threshold may be appropriately substituted with "more than" or "less than", respectively in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP LTE/LTE-A is primarily described for clear description, but technical spirit of the present invention is not limited thereto.

FIG. 1 illustrates physical channels used in a 3GPP system and a general signal transmitting method using the physical channels. A user equipment receives information from a base station through downlink (DL) and the user equipment transmits information through uplink (UL) to the base station. The information transmitted/received between the base station and the user equipment includes data and various control information and various physical channels exist according to a type/purpose of the information transmitted/received between the base station and the user equipment.

When a power of the user equipment is turned on or the user equipment newly enters a cell, the user equipment performs an initial cell search operation including synchronization with the base station, and the like (S301). To this end, the user equipment receives a primary synchronization channel (P-SCH) and a secondary synchronization channel (S-SCH) from the base station to synchronize with the base station and obtain information including a cell ID, and the like. Thereafter, the user equipment receives a physical broadcast channel from the base station to obtain intra-cell broadcast information. The user equipment receives a downlink reference signal (DL RS) in an initial cell search step to verify a downlink channel state.

The user equipment that completes initial cell search receives a physical downlink control channel (PDCCH) and a physical downlink shared channel (PDSCH) depending on information loaded on the PDCCH to obtain more detailed system information (S302).

When there is no radio resource for initially accessing the base station or signal transmission, the user equipment may perform a random access procedure (RACH procedure) to the base station (S303 to S306). To this end, the user equipment may transmit a preamble through a physical random access channel (PRACH) (S303) and receive a response message to the preamble through the PDCCH and the PDSCH corresponding thereto (S304). In the case of a contention based RACH, a contention resolution procedure may be additionally performed.

Thereafter, the user equipment may receive the PDCCH/PDSCH (S307) and transmit a physical uplink shared channel (PUSCH)/physical uplink control channel (PUCCH) (S308) as a general procedure. The user equipment receives downlink control information (DCI) through the PDCCH. The DCI includes control information such as resource allocation information to the user equipment and a format varies depending on a use purpose. The control information which the user equipment transmits to the base station is designated as uplink control information (UCI). The UCI includes an acknowledgement/negative acknowledgement (ACK/NACK), a channel quality indicator (CQI), a precoding matrix index (PMI), a rank indicator (RI), and the like. The UCI may be transmitted through the PUSCH and/or PUCCH.

FIG. 2 illustrates one example of a radio frame structure used in a wireless communication system. FIG. 2A illustrates a frame structure for frequency division duplex (1-DD) and FIG. 2B illustrates a frame structure for time division duplex (TDD).

Referring to FIG. 2, a radio frame may have a length of 10 ms (307200 Ts) and be constituted by 10 subframes (SFs). Ts represents a sampling time and is expressed as Ts=1/(2048*15 kHz). Each subframe may have a length of 1 ms and be constituted by 2 slots. Each slot has a length of 0.5 ms. A time for transmitting one subframe is defined as a transmission time interval (TTI). A time resource may be distinguished by radio frame numbers/indexes, subframe numbers/indexes #0 to #9, and slot numbers/indexes #0 to #19.

The radio frame may be configured differently according to a duplex mode. In an FDD mode, downlink transmission and uplink transmission are distinguished by a frequency and the radio frame includes only one of a downlink subframe and an uplink subframe with respect to a specific frequency band. In a TDD mode, the downlink transmission and the uplink transmission are distinguished by a time and the radio frame includes both the downlink subframe and the uplink subframe with respect to a specific frequency band. The TDD radio frame further includes special subframes for downlink and uplink switching. The special subframe includes a Downlink Pilot Time Slot (DwPTS), a guard period (GP), and an Uplink Pilot Time Slot (UpPTS).

FIG. 3 illustrates a structure of a downlink/uplink slot.

Referring to FIG. 3, the slot includes a plurality of orthogonal frequency divisional multiplexing (OFDM) symbols in a time domain and a plurality of resource blocks (RBs) in a frequency domain. The OFDM symbol also means one symbol period. The OFDM symbol may be called an OFDMA symbol, a single carrier frequency division multiple access (SC-FDMA) symbol, or the like according to a multi-access scheme. The number of OFDM symbols included in one slot may be variously modified according to the length of a cyclic prefix (CP). For example, in the case of a normal CP, one slot includes 7 OFDM symbols and in the case of an extended CP, one slot includes 6 OFDM symbols. The RB is defined as NDL/ULsymb (e.g., 7) continuous OFDM symbols in the time domain and NRBsc (e.g., 12) continuous subcarriersin the frequency domain. A resource constituted by one OFDM symbol and one subcarrier is referred to as a resource element (RE) or a tone. One RB is constituted by NDL/ULsymb*NRBsc resource elements.

The resource of the slot may be expressed as a resource grid constituted by NDL/ULRB*NRBsc subcarriers and NDL/ULsymb OFDM symbols. Each RE in the resource grid is uniquely defined by an index pair (k, 1) for each slot. k represents an index given with 0 to NDL/ULRB*NRBsc−1 in the frequency domain and 1 represents an index given with 0 to NDL/ULsymb−1 in the time domain. Herein, NDLRB represents the number of resource blocks (RBs) in the downlink slot and NULRB represents the number of RBs in the UL slot. NDLRB and NULRB depend on a DL transmission bandwidth and a UL transmission bandwidth, respectively. NDLsymb represents the number of symbols in the downlink slot and NULsymb represents the number of symbols in the UL slot. NRBsc represents the number of subcarriers constituting one RB. One resource grid is provided per antenna port.

FIG. 4 illustrates a structure of a downlink subframe.

Referring to FIG. 4, the subframe may be constituted by 14 OFDM symbols. First 1 to 3 (alternatively, 2 to 4) OFDM symbols are used as a control region and the remaining 13 to 11 (alternatively, 12 to 10) OFDM symbols are used as a data region according to subframe setting. R1 to R4 represent reference signals for antenna ports 0 to 3. Control channels allocated to the control region include a physical control format indicator channel (PCFICH), a physical hybrid-ARQ indicator channel (PHICH), a physical downlink control channel (PDCCH), and the like. Data channels allocated to the data region include the PDSCH, and the like. When an enhanced PDCCH (EPDCCH) is set, the PDSCH and the EPDCCH are multiplexed by frequency division multiplexing (FDM) in the data region.

The PDCCH as the physical downlink control channel is allocated to first n OFDM symbols of the subframe. n as an integer of 1 (alternatively, 2) or more is indicated by the PCFICH. The PDCCH announces information associated with resource allocation of a paging channel (PCH) and a downlink-shared channel (DL-SCH) as transmission channels, an uplink scheduling grant, HARQ information, and the like to each user equipment or user equipment group. Data (that is, transport block) of the PCH and the DL-SCH are transmitted through the PDSCH. Each of the base station and the user equipment generally transmit and receive data through the PDSCH except for specific control information or specific service data.

Information indicating to which user equipment (one or a plurality of user equipment) the data of the PDSCH is transmitted, information indicating how the user equipment receive and decode the PDSCH data, and the like are transmitted while being included in the PDCCH/EPDCCH. For example, it is assumed that the PDCCH/EPDCCH is CRC-masked with a radio network temporary identity (RNTI) called "A" and information regarding data transmitted by using a radio resource (e.g., frequency location) called "B" and a DCI format called "C", that is, transmission format information (e.g., transport block size, modulation scheme, coding information, and the like) is transmitted through a specific subframe. In this case, a user equipment in the cell monitors the PDCCH/EPDCCH by using the RNTI information thereof and when one or more user equipment having the "A" RNTI are provided, the user equipment receives the PDCCH/EPDCCH and receive the PDSCH indicated by "B" and "C" through information on the received PDCCH/EPDCCH.

FIG. 5 illustrates a structure of an uplink subframe.

Referring to FIG. 5, the subframe may be divided into the control region and the data region in the frequency domain. The PUCCH is allocated to the control region and carries the UCI. The PUSCH is allocated to the data region and carries user data.

The PUCCH may be used to transmit the following control information.

Scheduling Request (SR): Information used to request a UL-SCH resource. The SR is transmitted by using an on-off keying (OOK) scheme.

HARQ-ACK: Response to the PDCCH and/or response to a downlink data packet (e.g., codeword) on the PDSCH. The codeword is an encoded format of the transport block. The HARQ-ACK indicates whether the PDCCH or PDSCH is successfully received. The HARQ-ACK response includes a positive ACK (simply, ACK), a negative ACK (NACK), discontinuous transmission (DTX), or the NACK/DTX. The DTX represents a case in which the user equipment misses the PDCCH (alternatively, semi-persistent scheduling (SPS) PDSCH) and the NACK/DTX means the NACK or DTX. The HARQ-ACK is mixedly used with the HARQ-ACK/NACK and the ACK/NACK.

Channel State Information (CSI): Feed-back information regarding the downlink channel Multiple input multiple output (MIMO) related feed-back information includes the RI and the PMI.

Table 1 shows the relationship between a PUCCH format and the UCI.

TABLE 1

| PUCCH Format | Uplink control information (UCI) |
| --- | --- |
| Format 1 | Scheduling request (SR) (non-modulated waveform) |
| Format 1a | 1-bit HARQ ACK/NACK (SR existence/non-existence) |
| Format 1b | 2-bit HARQ ACK/NACK (SR existence/non-existence) |
| Format 2 | CSI (20 coded bits) |
| Format 2 | CSI and 1 or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Hereinafter, carrier aggregation will be described. The carrier aggregation means a method in which the wireless communication system uses a plurality of frequency blocks as one large logical frequency band in order to use a wider frequency band. When a whole system band is extended by the carrier aggregation, a frequency band used for communication with each user equipment is defined by a component carrier (CC) unit.

FIG. 6 is a diagram for describing single carrier communication and multi-carrier communication. FIG. 6A illustrates a subframe structure of a single carrier and FIG. 6B illustrates a subframe structure of multi-carriers which are carrier-aggregated.

Referring to FIG. 6A, in a single carrier system, the base station and the user equipment perform data communication through one DL band and one UL band corresponding thereto. The DL/UL band is divided into a plurality of orthogonal subcarriers and each frequency band operates at one carrier frequency. In the FDD, the DL and UL bands operate at different carrier frequencies, respectively and in the TDD, the DL and UL bands operate at the same carrier frequency. The carrier frequency means a center frequency of the frequency band.

Referring to FIG. 6B, the carrier aggregation is distinguished from an OFDM system that performs DL/UL communication in a base frequency band divided into a plurality of subcarriers by using one carrier frequency, in that the carrier aggregation performs DL/UL communication by using a plurality of carrier frequencies. Referring to FIG. 6B, three 20 MHz CCs are gathered in each of the UL and the DL to support a bandwidth of 60 MHz. The CCs may be adjacent to each other or non-adjacent to each other in the frequency domain. For convenience, FIG. 6B illustrates a case in which a bandwidth of a UL CC and a bandwidth of a DL CC are the same as each other and symmetric to each other, but the bandwidths of the respective CCs may be independently decided. Further, asymmetric carrier aggregation in which the number of UL CCs and the number of DL CCs are different from each other is also available. The DL/UL CC(s) are independently allocated/configured for each user equipment and the DL/UL CC(s) allocated/configured to the user equipment are designated as serving UL/DL CC(s) of the corresponding user equipment.

The base station may activate some or all of serving CCs of the user equipment or deactivate some CCs. When the base station allocates the CC(s) to the user equipment, if the CC allocation to the user equipment is wholly reconfigured or if the user equipment does not hand over, at least one specific CC among the CC(s) configured with respect to the corresponding user equipment is not deactivated. A specific CC which is always activated is referred to as a primary CC (PCC) and a CC which the base station may arbitrarily activate/deactivate is referred to as a secondary CC (SCC). The PCC and the SCC may be distinguished based on the control information. For example, specific control information may be set to be transmitted/received only through a specific CC and the specific CC may be referred to as the PCC and remaining CC(s) may be referred to as SCC(s). The PUCCH is transmitted only on the PCC.

In 3GPP, a concept of the cell is used in order to manage the radio resource. The cell is defined as a combination of the DL resource and the UL resource, that is, a combination of the DL CC and the UL CC. The cell may be configured by the DL resource only or the combination of the DL resource and the UL resource. When the carrier aggregation is supported, a linkage between the carrier frequency of the DL resource (alternatively, DL CC) and the carrier frequency of the UL resource (alternatively, UL CC) may be indicated by system information. For example, the combination of the DL resource and the UL resource may be indicated by a system information block type 2 (SIB2) linkage. The carrier frequency means a center frequency of each cell or CC. A cell corresponding to the PCC is referred to as the primary cell (PCell) and a cell corresponding to the SCC is referred to as the secondary cell (SCell). A carrier corresponding to the PCell is a DL PCC in the downlink and a carrier corresponding to the PCell is a UL PCC in the uplink. Similarly, a carrier corresponding to the SCell is a DL SCC in the downlink and a carrier corresponding to the SCell is a UL SCC in the uplink. According to a user equipment capability, the serving cell(s) may be constituted by one PCell and 0 or more SCells. For a user equipment which is in an RRC_CONNECTED state, but does not have any configuration for the carrier aggregation or does not support the carrier aggregation, only one serving cell constituted by only the PCell is present.

FIG. 7 illustrates an example in which cross carrier scheduling is applied. When the cross carrier scheduling is configured, a control channel transmitted through a first CC may schedule a data channel transmitted through the first CC or a second CC by using a carrier indicator field (CIF). The CIF is included in the DCI. In other words, a scheduling cell is configured, and a DL grant/UL grant transmitted in a PDCCH area of the scheduling cell schedules the PDSCH/PUSCH of a scheduled cell. That is, a search space for a plurality of component carriers is present in the PDCCH area of the scheduling cell. The PCell may be basically the scheduling cell and a specific SCell may be designated as the scheduling cell by an upper layer.

In FIG. 7, it is assumed that three DL CCs are aggregated. Herein, DL component carrier #0 is assumed as the DL PCC (alternatively, PCell) and DL component carrier #1 and DL component carrier #2 are assumed as the DL SCC (alternatively, SCell). Further, it is assumed that the DL PCC is set as a PDCCH monitoring CC. When the CIF is disabled, the respective DL CCs may transmit only the PDCCH that schedules the PDSCH thereof without the CIF according to an LTE PDCCH rule (non-cross carrier scheduling or self-carrier scheduling). On the contrary, when the CIF is enabled by UE-specific (alternatively, UE-group-specific or cell-specific) upper layer signaling, a specific CC (e.g., DL PCC) may transmit the PDCCH scheduling the PDSCH of DL CC A and the PDCCH scheduling the PDSCH of another CC by using the CIF (cross-carrier scheduling). On the contrary, in another DL CC, the PDCCH is not transmitted.

Hereinafter, DRS transmission in a licensed band will be described with reference to FIGS. 8 to 11. FIG. 8 illustrates DRS transmission, and FIGS. 9 to 11 illustrate a structure of a reference signal used in DRS. For convenience, DRS in the licensed band is referred to as Rel-12 DRS. DRS supports small cell on/off, and a SCell that is not active for any user equipment may be turned off except for DRS periodic transmission. Also, based on the DRS, a user equipment may obtain cell identification information, measure Radio Resource Management (RRM), and obtain downlink synchronization.

Referring to FIG. 8, a Discovery Measurement Timing Configuration (DMTC) indicates a time window in which a user equipment expects to receive DRS. The DMTC is fixed at 6 ms. The DMTC period is the transmission period of the DMTC, and may be 40 ms, 80 ms, or 160 ms. The position of the DMTC is specified by the DMTC transmission period and the DMTC offset (in units of subframes), and these information are transmitted to the user equipment through higher layer signaling (e.g., RRC signaling). DRS transmissions occur at the DRS occasion within the DMTC. The DRS occasion has a transmission period of 40 ms, 80 ms or 160 ms, and the user equipment may assume that there is one DRS occasion per DMTC period. The DRS occasion includes 1 to 5 consecutive subframes in the FDD radio frame and 2 to 5 consecutive subframes in the TDD radio frame. The length of the DRS occasion is delivered to the user equipment via higher layer signaling (e.g., RRC signaling). The user equipment may assume DRS in the DL subframe in the DRS occasion. DRS occasion may exist anywhere in the DMTC, but the user equipment expects the transmission interval of DRSs transmitted from the cell to be fixed (i.e., 40 ms, 80 ms, or 160 ms). That is, the position of the DRS occasion in the DMTC is fixed per cell. The DRS is configured as follows.

Cell-specific Reference Signal (CRS) at antenna port 0 (see FIG. 9): It exists in all downlink subframes within the DRS occasion, and in the DwPTS of all the special subframes. The CRS is transmitted in the entire band of the subframe.

Primary Synchronization Signal (PSS) (see FIG. 10): In the case of FDD radio frame, it exists in the first subframe in DRS occasion, or in the second subframe in DRS occasion in the case of TDD radio frame. The PSS is transmitted in the seventh (or sixth) OFMDA symbol of the subframe and mapped to six RBs (=72 subcarriers) close to the center frequency.

Secondary Synchronization Signal (SSS) (see FIG. 10): It exists in the first subframe in the DRS occasion. The SSS is transmitted in the sixth (or fifth) OFMDA symbol of the subframe and mapped to six RBs (=72 subcarriers) close to the center frequency.

non-zero-power Channel State Information (CSI)-RS (see FIG. 11): It exists in zero or more subframes in the DRS occasion. The position of the non-zero-power CSI-RS is variously configured according to the number of CSI-RS ports and the higher layer configuration information.

FIG. 8 illustrates a case where the DRS reception time is set to a separate DMTC for each frequency in a user equipment's situation. Referring to FIG. 8, in the case of frequency F1, a DRS occasion with a length of 2 ms is transmitted every 40 ms, in the case of frequency F2, a DRS occasion with a length of 3 ms is transmitted every 80 ms, and in the case of frequency F3, a DRS occasion with a length of 4 ms is transmitted every 80 ms. The user equipment may know the starting position of the DRS occasion in the DMTC from the subframe including the SSS. Here, the frequencies F1 to F3 may be replaced with corresponding cells, respectively.

Embodiment: DRS Transmission Scheme in Unlicensed Band

FIG. 12 illustrates a Licensed Assisted Access (LAA) service environment.

Referring to FIG. 12, a service environment may be provided to a user, in the service environment, an LTE technology (11) in a conventional licensed band and LTE-unlicensed (LTE-U) or LAA which is an LTE technology (12) in an unlicensed band, which has been actively discussed may be connected to each other. For example, the LTE technology (11) in the licensed band and the LTE technology (12) in the unlicensed band in the LAA environment may be integrated by using a technology such as carrier aggregation, or the like, which may contribute to extension of a network capacity. Further, in an asymmetric traffic structure in which the amount of downlink data is more than that of uplink data, the LAA may provide an optimized LTE service according to various requirements or environments. For convenience, the LTE technology in the licensed (alternatively, authorized or permitted) band is referred to as LTE-licensed (LTE-L) and the LTE technology in the unlicensed (alternatively, unauthorized, non-licensed, license-unnecessary) band is referred to as LTE-unlicensed (LTE-U) or LAA.

FIG. 13 illustrates a layout scenario of a user equipment and a base station in an LAA service environment. A frequency band targeted by the LAA service environment has a short wireless communication reach distance due to a high-frequency characteristic. By considering this, the layout scenario of the user equipment and the base station in an environment in which the conventional LTE-L service and the LAA service coexist may be an overlay model and a co-located model.

In the overlay model, a macro base station may perform wireless communication with an X UE and an X' UE in a macro area (32) by using a licensed carrier and be connected with multiple radio remote heads (RRHs) through an X2 interface. Each RRH may perform wireless communication with an X UE or an X' UE in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the LAA service as an auxiliary downlink channel of the LTE-L service through the carrier aggregation.

In the co-located model, a pico/femto base station may perform the wireless communication with a Y UE by using both the licensed carrier and the unlicensed carrier. However, it may be limited that the pico/femto base station uses both the LTE-L service and the LAA service to downlink transmission. A coverage (33) of the LTE-L service and a coverage (34) of the LAA service may be different according to the frequency band, transmission power, and the like.

When LTE communication is performed in the unlicensed band, conventional equipment (e.g., wireless LAN (Wi-Fi) equipment) which perform communication in the corresponding unlicensed band may not demodulate an LTE-U message or data and determine the LTE-U message or data as a kind of energy to perform an interference avoidance operation by an energy detection technique. That is, when energy corresponding to the LTE-U message or data is lower than −62 dBm or certain energy detection (ED) threshold value, the wireless LAN equipment may perform communication by disregarding the corresponding message or data. As a result, that user equipment which performs the LTE communication in the unlicensed band may be frequently interfered by the wireless LAN equipment.

Therefore, a specific frequency band needs to be allocated or reserved for a specific time in order to effectively implement an LTE-U technology/service. However, since peripheral equipment which perform communication through the unlicensed band attempt access based on the energy detection technique, there is a problem in that an efficient LTE-U service is difficult. Therefore, a research into a coexistence scheme with the conventional unlicensed band device and a scheme for efficiently sharing a radio channel needs to be preferentially made in order to settle the LTE-U technology. That is, a robust coexistence mechanism in which the LTE-U device does not influence the conventional unlicensed band device needs to be developed.

FIG. 14 illustrates a communication scheme (e.g., wireless LAN) that operates in an unlicensed band in the related art. Since most devices that operate in the unlicensed band operate based on listen-before-talk (LBT), a clear channel assessment (CCA) technique that senses a channel before data transmission is performed.

Referring to FIG. 14, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a back-off procedure after a defer period (e.g., arbitration interframe space (AIFS), PCF IFS (PIFS), or the like). The defer period means a minimum time when the terminal needs to wait after the channel is idle. The back-off procedure allows the terminal to further wait for a predetermined time after the defer period. For example, the terminal stands by while decreasing a slot time for slot times corresponding to a random number allocated to the terminal in the contention window (CW) during the channel is in an idle state, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the back-off procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since most communications in the unlicensed band in the related art operate based on the LBT, the LTE also considers the LBT in the LAA for coexistence with the conventional device. In detail, in the LTE, the channel access method on the unlicensed band may be divided into 4 following categories according to the presence/an application scheme of the LBT.

Category 1: No LBT
An LBT procedure by a Tx entity is not performed.
Category 2: LBT without random back-off
A time interval in which the channel needs to be sensed in an idle state before the Tx entity performs a transmission on the channel is decided. The random back-off is not performed.
Category 3: LBT with random back-off with a CW of fixed size
LBT method that performs random back-off by using a CW of a fixed size. The Tx entity has a random number N in the CW and the CW size is defined by a minimum/maximum value of N. The CW size is fixed. The random number N is used to decide the time interval in which the channel needs to be sensed in an idle state before the Tx entity performs a transmission on the channel
Category 4: LBT with random back-off with a CW of variable size
LBT method that performs the random back-off by using a CW of a variable size. The Tx entity has the random number N in the CW and the CW size is defined by the minimum/maximum value of N. The Tx entity may change the CW size at the time of generating the random number N. The random number N is used to decide the time interval in which the channel needs to be sensed in an idle state before the Tx entity performs a transmission on the channel.

FIGS. 15 and 16 illustrate a DL transmitting process based on the category 4 LBT. The category 4 LBT may be used to guarantee fair channel access with Wi-Fi. Referring to FIGS. 15 and 16, the LBT process includes initial CCA (ICCA) and extended CCA (ECCA). In the ICCA, the random back-off is not performed and in the ECCA, the random back-off is performed by using the CW of the variable size. The ICCA is applied to the case in which the channel is idle when signal transmission is required and the ECCA is applied to the case in which the channel is busy when the signal transmission is required or DL transmission is performed just before. That is, it is determined whether the channel is idle through the ICCA, and data transmission is performed after the ICCA period. If the interference signal is detected and data transmission fails, a data transmission time point may be obtained through a defer period+backoff counter after setting a random backoff counter.

Referring to FIG. 15, a signal transmitting process may be performed as follows.

Initial CCA
S1202: The base station verifies that the channel is idle.
S1204: The base station verifies whether the signal transmission is required. When the signal transmission is not required, the process returns to S1202 and when the signal transmission is required, the process proceeds to S1206.

S1206: The base station verifies whether the channel is idle for an ICCA defer period (BCCA). The ICCA defer period is configurable. As an implementation example, the ICCA defer period may be constituted by an interval of 16 μs and n consecutive CCA slots. Herein, n may be a positive integer and one CCA slot interval may be 9 μs. The number of CCA slots may be configured differently according to a QoS class. The ICCA defer period may be set to an appropriate value by considering a defer period (e.g., DIFS or AIFS) of Wi-Fi. For example, the ICCA defer period may be 34 us. When the channel is idle for the ICCA defer period, the base station may perform the signal transmitting process (S1208). When it is determined that the channel is busy during the ICCA defer period, the process proceeds to S1212 (ECCA).

S1208: The base station may perform the signal transmitting process.

When the signal transmission is not performed, the process proceeds to S1202 (ICCA) and when the signal transmission is performed, the process proceeds to S1210. Even in the case where a back-off counter N reaches 0 in S1218 and S1208 is performed, when the signal transmission is not performed, the process proceeds to S1202 (ICCA) and when the signal transmission is performed, the process proceeds to S1210.

S1210: When additional signal transmission is not required, the process proceeds to S1202 (ICCA) and when the additional signal transmission is required, the process proceeds to S1212 (ECCA).

Extended CCA
S1212: The base station generates the random number N in the CW. N is used as a counter during the back-off process and generated from [0, q−1]. The CW may be constituted by q ECCA slots and an ECCA slot size may be 9 μs or 10 μs. The CW size (CWS) may be defined as q and be variable in S1214. Thereafter, the base station proceeds to S1216.

S1214: The base station may update the CWS. The CWS q may be updated to a value between X and Y. The X and Y values are configurable parameters. CWS update/adjustment may be performed whenever N is generated (dynamic back-off) and semi-statically performed at a predetermined time interval (semi-static back-off). The CWS may be updated/adjusted based on exponential back-off or binary back-off. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S1216: The base station verifies whether the channel is idle for an ECCA defer period (DeCCA). The ECCA defer period is configurable. As an implementation example, the ECCA defer period may be constituted by an interval of 16 μs and n consecutive CCA slots. Herein, n may be a positive integer and one CCA slot interval may be 9 μs. The number of CCA slots may be configured differently according to the QoS class. The ECCA defer period may be set to the appropriate value by considering the defer period (e.g., DIFS or AIFS) of Wi-Fi. For example, the ECCA defer period may be 34 us. When the channel is idle for the ECCA defer period, the base station proceeds to S1218. When it is determined that the channel is busy during the ECCA defer period, the base station repeats S1216.

S1218: The base station verifies whether N is 0. When N is 0, the base station may perform the signal transmitting process (S1208). In this case, (N=0), the base station may not immediately perform transmission and performs CCA check for at least one slot to continue the ECCA process. When N is not 0 (that is, N>0), the process proceeds to S1220.

S1220: The base station senses the channel during one ECCA slot interval (T). The ECCA slot size may be 9 μs or 10 μs and an actual sensing time may be at least 4 as.

S1222: When it is determined that the channel is idle, the process proceeds to S1224. When it is determined that the channel is busy, the process returns to S1216. That is, one ECCA defer period is applied again after the channel is idle and N is not counted during the ECCA defer period.

S1224: N is decreased by 1 (ECCA countdown).

FIG. 16 is substantially the same as/similar to the transmitting process of FIG. 15 and is different from FIG. 15 according to an implementation scheme. Therefore, detailed matters may be described with reference to contents of FIG. 15.

S1302: The base station verifies whether the signal transmission is required. When the signal transmission is not required, S1302 is repeated and when the signal transmission is required, the process proceeds to S1304.

S1304: The base station verifies whether the slot is idle. When the slot is idle, the process proceeds to S1306 and when the slot is busy, the process proceeds to S1312 (ECCA). The slot may correspond to the CCA slot in FIG. 15.

S1306: The base station verifies whether the channel is idle for a defer period (D). D may correspond to the ICCA defer period in FIG. 15. When the channel is idle for the defer period, the base station may perform the signal transmitting process (S1308). When it is determined that the channel is busy during the defer period, the process proceeds to S1304.

S1308: The base station may perform the signal transmitting process if necessary.

S1310: When the signal transmission is not performed, the process proceeds to S1302 (ICCA) and when the signal transmission is performed, the process proceeds to S1312 (ECCA). Even in the case where the back-off counter N reaches 0 in S1318 and S1308 is performed, when the signal transmission is not performed, the process proceeds to S1302 (ICCA) and when the signal transmission is performed, the process proceeds to S1312 (ECCA).

Extended CCA

S1312: The base station generates the random number N in the CW. N is used as the counter during the back-off process and generated from [0, q−1]. The CW size (CWS) may be defined as q and be variable in S1314. Thereafter, the base station proceeds to S1316.

S1314: The base station may update the CWS. The CWS q may be updated to the value between X and Y. The X and Y values are configurable parameters. CWS update/adjustment may be performed whenever N is generated (dynamic back-off) and semi-statically performed at a predetermined time interval (semi-static back-off). The CWS may be updated/adjusted based on exponential back-off or binary back-off. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S1316: The base station verifies whether the channel is idle for the defer period (D). D may correspond to the ECCA defer period in FIG. 15. D in S1306 and D in S1316 may be the same as each other. When the channel is idle for the defer period, the base station proceeds to S1318. When it is determined that the channel is busy during the defer period, the base station repeats S1316.

S1318: The base station verifies whether N is 0. When N is 0, the base station may perform the signal transmitting process (S1308). In this case, (N=0), the base station may not immediately perform transmission and performs CCA check during at least one slot to continue the ECCA process. When N is not 0 (that is, N>0), the process proceeds to S1320.

S1320: The base station selects one of an operation of decreasing N by 1 (ECCA count-down) and an operation of not decreasing N (self-defer). The self-defer operation may be performed according to implementation/selection of the base station and the base station does not perform sensing for energy detection and not perform even ECCA countdown in the self-defer.

S1322: The base station may select one of the operation not performing sensing for energy detection and the energy detecting operation. When the sensing for the energy detection is not performed, the process proceeds to S1324. When the energy detecting operation is performed, if an energy level is equal to or lower than an energy detection threshold (that is, idle), the process proceeds to S1324. If the energy level is higher than the energy detection threshold (that is, busy), the process returns to S1316. That is, one defer period is applied again after the channel is idle and N is not counted during the defer period.

S1324: The process proceeds to S1318.

FIG. 17 illustrates an example in which a base station performs DL transmission in an unlicensed band. The base station may aggregate cells (for convenience, LTE-L cell) of one or more licensed bands and cells (for convenience, LTE-U cell) of one or more unlicensed bands. In FIG. 17, a case in which one LTE-L cell and one LTE-U cell are aggregated for communication with the user equipment is assumed. The LTE-L cell may be the PCell and the LTE-U cell may be the SCell. In the LTE-L cell, the base station may exclusively use the frequency resource and perform an operation depending on LTE in the related art. Therefore, all of the radio frames may be constituted by regular subframes (rSF) having a length of 1 ms (see FIG. 2) and the DL transmission (e.g., PDCCH and PDSCH) may be performed every subframe (see FIG. 1). Meanwhile, in the LTE-U cell, the DL transmission is performed based on the LBT for coexistence with the conventional device (e.g., Wi-Fi device). Further, a specific frequency band needs to be allocated or reserved for a specific time in order to effectively implement the LTE-U technology/service. Therefore, in the LTE-U cell, the DL transmission may be performed through a set of one or more consecutive subframes (DL transmission burst) after the LBT. The DL transmission burst may start as the regular subframe (rSF) or a partial subframe (pSF) according to an LBT situation. pSF may be a part of the subframe and may include a second slot of the subframe. Further, the DL transmission burst may end as rSF or pSF.

Hereinafter, DRS transmission in an unlicensed band will be described. Using Rel-12 DRS on carriers within the unlicensed band introduces new limitations. LBT regulation in some areas treats DRS as a short control transmission, allowing DRS transmission without LBT. However, in some areas (such as Japan), LBT is also required for short control transmissions. Therefore, it is required to apply the LBT to the DRS transmission on the LAA SCELL.

FIG. 18 illustrates DRS transmission in an unlicensed band. When LBT is applied to DRS transmission, DRS may not be periodically transmitted due to LBT failure in the unlicensed band, unlike Rel-12 DRS transmitted in the licensed band. If the DRS transmission fails within the DMTC, the following two options may be considered.

Alt1: The DRS may only be transmitted at a fixed time point within the DMTC. Therefore, when the DRS transmission fails, there is no DRS transmission in the DMTC.

Alt2: The DRS may be transmitted in at least one other time point within the DMTC. Thus, when a DRS transmission fails, a DRS transmission may be attempted at another time point within the DMTC.

Hereinafter, DRS transmission in an unlicensed band will be described. Specifically, a parameter for DRS transmission suitable for LAA based on DRS of 3GPP LTE Rel-12, a DRS transmission method, and the like are suggested. For convenience, DRS in the existing licensed band is referred to as Rel-12 DRS or LTE-L DRS, and DRS in the unlicensed band is referred to as LAA DRS or LTE-U DRS.

FIG. 19 illustrates a parameter for LAA DRS transmission and a DRS transmission method based on LBT. The DRS transmission period is configured by the DMTC, and the DMTC period in the Rel-12 DRS is configured to 40/80/160 ms (see FIG. 8). However, when the channel of the transmission time point is busy due to the peripheral interference or the like in the case of the DRS transmitted in the LAA based on the LBT, the DRS may not be transmitted according to the DRS transmission period. Therefore, if the DMTC period is configured to the same as that in the LAA DRS, the transmission frequency of the LAA DRS may be lowered. Therefore, a new DMTC period is required in the LAA, and may be configured to 40 ms or less, for example. In addition, the base station may attempt to transmit DRS at least once within the DMTC period, and may configure a duration such as the DMTC and may be configured to transmit DRS in the corresponding duration. Accordingly, since the user equipment expects DRS transmission only in the DMTC, DRS search/detection is performed only in the corresponding DMTC, thereby reducing the power consumption of the user equipment and the burden of blind detection/decoding. When a DRS transmission occurs in the DMTC, the base station transmits a DRS configuration (e.g., a configuration with CRS/PSS/SSS/CSI-RS in Rel-12) when the channel is idle after LBT. DRS transmission duration may be defined as DRS occasion duration. The DRS occasion duration in Rel-12 may be configured to 1 to 5 ms. Since LAA operates based on LBT, as the DRS length (=DRS occasion duration) becomes longer, the transmittable time point decreases, and in the case of long DRS, continuous transmission is required so that idle duration does not occur in order to prevent the transmission of other base stations/terminals/Wi-Fi devices based on LBT. FIG. 19 shows a DRS occasion duration having a length of at least one subframe for convenience, but the length of the DRS occasion duration is not limited thereto. A method of transmitting DRS after LBT is broadly classified into two. There are an A1a (DRS Alt. 1) technique, which allows transmission from a fixed location (for convenience, the DMTC starting location) in the DMTC based on the LBT, and an Alt2 (DRS Alt. 2) technique, which allows at least one other DRS transmission even if the CCA result channel is busy in the DMTC and the DRS transmission fails.

FIG. 20 illustrates a case where simultaneous transmission of LAA DRS+PDSCH occurs in SF #0/#5 in the LAA DMTC, and FIG. 21 illustrates a case where simultaneous transmission of LAA DRS+PDSCH occurs in SF except for SF #0/#5 in LAA DMTC. SF #0/#5 represents SF #0 and/or SF #5. In the LAA DRS transmission, the last two OFDM symbols of the SF (e. g., OFDM symbol index #12/#13) are used as the CCA interval for the LBT of the next transmission. Therefore, the last two OFDM symbols of SF are not used for LAA DRS transmission.

As shown in FIG. 21, when the DRS transmission is moved to the SF other than the SF #0/#5 due to the LBT, the PSS/SSS/CRS/CSI-RS that configures the DRS is transmitted in the OFDM symbol index within the corresponding SF which is same as the OFDM symbol index within the SF #0/#5. That is, the PSS (DRS) configuring the DRS is transmitted in the last OFDM symbol (e.g., symbol index #6) of the first slot in the corresponding SF, and the SSS configuring the DRS is transmitted in the OFDM symbol index #5 ahead of the PSS in the corresponding SF. Also, the CSI-RS configuring the DRS is transmitted in the OFDM symbol index #9/#10.

In this case (i.e., DRS is transmitted in the SF except SF #0/#5), CSI-RS configured for periodic or aperiodic CSI-RS/CSI-Interference Measurement (IM) and DRS collide with each other, so that CSI-RS/CSI-IM measurements (briefly, CSI measurements) may be affected. That is, when CSI-RS is configured in an OFDM symbol index where DRS (e.g., PSS/SSS) is transmitted, the CSI-RS/CSI-IM measurement may not be performed, or the measurement performance may deteriorate. Accordingly, there may be a problem in ensuring reliability in the CSI-RS/CSI-IM measurement.

Hereinafter, in an embodiment of the present invention, a method for enabling CSI-RS/CSI-IM measurement when DRS transmission is performed and ensuring the accuracy and reliability of CSI-RS/CSI-IM measurement will be described. An embodiment of the present invention may be applied when DRS is transmitted on a cell in an unlicensed band (e.g., LAA SCell). An embodiment of the present invention may be limited to a case where DRS is transmitted in SF other than SF #0/#5 (due to LBT etc.). Further, an embodiment of the present invention may be performed on the assumption that the base station explicitly or implicitly indicates the signaling for the DRS transmission to the user equipment. For convenience of explanation, (DRS) is added to the signal configuring the DRS. That is, the PSS/SSS/CRS/CSI-RS configuring the DRS may be expressed as PSS/SSS/CRS/CSI-RS (DRS). In addition, the CSI-RS configuring the DRS is denoted by CSI-RS (DRS), and the configuration of the CSI-RS configuring the DRS may be denoted by the CSI-RS (DRS) configuration. Meanwhile, the CSI-RS for CSI-RS/CSI-IM may be simply represented as CSI-RS/CSI-IM or may be represented as CSI-RS (CSI-RS/CSI-IM). The configuration of the CSI-RS for CSI-RS/CSI-IM may be expressed in a CSI-RS/CSI-IM configuration or in a CSI-RS configuration.

First, the conventional CSI-RS configuration will be described. FIG. 22 illustrates the location of REs (CRI-RS RE) occupied by the CSI-RS in the SF according to the number of antennas or the number of CSI-RS ports in one cell. Specifically, the resource mapping according to the CSI-RS configuration is determined by Table 2. Table 2 corresponds to Table 6. 10. 5. 2-1 of 3GPP TS 36. 211 V12. 6. 0. FIG. 22 and Table 2 correspond to the case of the normal CP. The CSI reference signal configuration is transmitted via RRC signaling. Specifically, the CSI reference signal configuration is specified by the resourceConfig of the MeasCSI-RS-Config which is an RRC parameter.

TABLE 2

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2  0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure  20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Here, k' is used to specify the subcarrier position, and l' is used to specify the OFDM symbol index within the slot. $n_s$ represents a slot index (0 to 19) in a radio frame (see FIG. 2). mod represents a modulo operation.

Specifically, the CSI-RS is transmitted periodically through 1, 2, 4 or 8 antenna ports (e.g., p=15, p=15 to 16, p=15 to 18, p=15 to 22) and the RS sequence $r_{l,n_s}(m)$ in the subframe configured for the CSI-RS transmission is mapped to the complex-valued modulation symbol $a_{k,l}^{(p)}$ as shown in Equation 1. $a_{k,l}^{(p)}$ is used as a reference symbol on the antenna port p.

[Equation 1]

$$a_{k,l}^{(p)} = w_{l''} \cdot r_{l,n_s}(m'), \text{ where}$$

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' +$$

-continued $$\begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Here, k represents a subcarrier index (refer to FIG. 3), and l represents an OFDM symbol index within the slot (refer to FIG. 3). $N_{RB}^{DL}$ represents the number of RBs in the DL band, and $N_{RB}^{maxDL}$ represents the number of RBs in the maximum DL band.

Referring to Table 2 and Equation 1, the CSI-RS configuration (or resourceConfig) allocated to the OFDM symbol indexes #5 and #6 in the first slot is {0, 5, 10, 11} and the CSI-RS configuration allocated to the OFDM symbol indexes #5 and #6 in the second slot or the OFDM symbol indexes #12 and #13 in the SF is {4, 9, 18, 19}. In addition, the CSI-RS configuration allocated to the OFDM symbol indexes #9 and #10 in the SF is {1, 2, 3, 6, 7, 8, 12, 13, 14, 15, 16, 17}.

Case 1) if CSI-RS is Configured in DRS in Unlicensed Band Cell

When CSI-RS is configured in DRS, the configuration of CSI-RS that configures DRS is CSI-RS configuration using OFDM symbol index #9/#10 (SF reference). Therefore, the CSI-RS configuration within the DMTC in the unlicensed band cell may be set to only the CSI-RS configuration allocated to the OFDM symbol #9/#10. Meanwhile, CSI-RS (DRS) and CSI-RS (CSI-RS/CSI-IM) are configured independently. Also, even if the DRS transmission is moved to the SF other than the SF #0/#5 due to the LBT, in order to enable CSI-RS/CSI-IM measurements, the base station may set the CSI-RS/CSI-IM configuration, MeasCSI-RS-Config which is the RRC parameter, to one of resourceConfig {1, 2, 3, 6, 7, 8, 12, 13, 14, 15, 16, 17} except for resourceConfig {0, 4, 5, 9, 10, 11, 18, 19} or one in a subset of resourceConfig {1, 2, 3, 6, 7, 8, 12, 13, 14, 15, 16, 17}, like the CSI-RS (DRS) configuration. A value of the CSI-RS configuration refers to Table 2. By configuring the CSI-RS/CSI-IM configuration as same as the CSI-RS (DRS) configuration, the collision of CSI-RS (CSI-RS/CSI-IM) and PSS/SSS (DRS) may be prevented and CSI measurement may be performed even when simultaneous transmission of PDSCH and DRS is performed. Thus, when the user equipment is configured to perform CSI-RS/CSI-IM measurements, the user equipment may assume that resourceConfig {0, 4, 5, 9, 10, 11, 18, 19} is not used for the CSI-RS/CSI-IM measurements. That is, when the user equipment is configured to perform CSI-RS/CSI-IM measurements, in the expectation that the CSI-RS/CSI-IM configuration is set to one of resourceConfig {1, 2, 3, 6, 7, 8, 12, 13, 14, 15, 16, 17} or one of a subset of resourceConfig {1, 2, 3, 6, 7, 8, 12, 13, 14, 15, 16, 17}, the user equipment may perform the CSI-RS/CSI-IM measurements.

To summarize, for an unlicensed band cell (e.g., LAA cell, LAA SCell), the base station may set a CSI-RS configuration to one of {1, 2, 3, 6, 7, 8, 12, 13, 14, 15, 16, 17} or to only {1, 2, 3, 6, 7, 8, 12, 13, 14, 15, 16, 17}. The user equipment may assume that a CSI-RS configuration of the unlicensed band cell may be set to one of {1, 2, 3, 6, 7, 8, 12, 13, 14, 15, 16, 17} or one of a subset of {1, 2, 3, 6, 7, 8, 12, 13, 14, 15, 16, 17}. That is, the base station may exclude the CSI-RS configuration {0, 4, 5, 9, 10, 11, 18, 19} in the unlicensed band cell, and the user equipment may assume that CSI-RS configuration {0, 4, 5, 9, 10, 11, 18, 19} is not used in the unlicensed band cell. On the other hand, there is no restriction on the CSI-RS configuration of licensed band cell. That is, the base station may use the CSI-RS configuration of Table 2 without limitation to configure the CSI-RS of the licensed band cell. That is, for the licensed band cell, the base station may set the CSI-RS configuration to one of {1, 2, ..., 19}. The user equipment may assume that the CSI-RS configuration of the licensed band cell is set to one of {1, 2, ..., 19}.

Also, an embodiment of the present invention may include a case where a resource (e.g., RE) mapped to CSI-RS (CSI-RS/CSI-IM) and a resource mapped to CSI-RS (DRS) are the same, in addition to a case where a CSI-RS (DRS) configuration and a CSI-RS/CSI-IM configuration are the same. In addition, the number of antenna ports of the CSI-RS (DRS) and the number of antenna ports of the CSI-RS (CSI-RS/CSI-IM) may be configured to be different from each other. In this case, if CSI-RS configurations are set to be equal to each other, REs to which CSI-RS (DRS) and CSI-RS/CSI-IM are mapped in time and frequency resources may overlap each other. At this time, the user equipment performs CSI measurement and/or RRM measurement based on the assumption of CSI-RS (DRS) transmission from the base station or performs CSI measurement based on the assumption of CSI-RS (CSI-RS/CSI-IM) transmission from the base station.

FIG. 23 illustrates a downlink transmitting process according to an embodiment of the present invention. The cellular communication system to which an embodiment of the present invention is applied may be limited to a 3GPP LTE-based communication system.

Referring to FIG. 23, the base station may select CSI-RS configuration information for the downlink cell from the CSI-RS configuration information set (S2302). The CSI-RS configuration information may indicate OFDM symbols for CSI-RS in a subframe including OFDM symbols #0 to #13 (see Table 2). Then, the base station may transmit the selected CSI-RS configuration information to the user equipment (S2304). Thereafter, the base station may transmit the CSI-RS to the user equipment in the downlink cell according to the selected CSI-RS configuration information (S2306). Here, the range of the CSI-RS configuration information set may vary according to the characteristics/classes/types of the band in which the downlink cell operates.

Specifically, when the downlink cell operates in the licensed band, the CSI-RS configuration information set may be a first CSI-RS configuration information set including one or more first CSI-RS configuration information related to the OFDM symbols #5/#6, one or more second CSI-RS configuration information related to the OFDM symbols #9/#10, and one or more third CSI-RS configuration information related to the OFDM symbols #12/#13. On the other hand, when the downlink cell operates in the unlicensed band, the CSI-RS configuration information set is a second CSI-RS configuration information set, and the second CSI-RS configuration information set may be part of the first CSI-RS configuration information set and not include the one or more third CSI-RS configuration information. Also, the second CSI-RS configuration information set may not include one or more first CSI-RS configuration information.

More specifically, the first CSI-RS configuration information set may be a CSI-RS configuration {0, 1, 2, 3, 4, 5, 6, 7, 8, 9, 10, 11, 12, 13, 14, 15, 16, 17, 18, 19} and the second CSI-RS configuration information set may be a CSI-RS configuration {1, 2, 3, 6, 7, 8, 12, 13, 14, 15, 16, 17}.

In this case, the OFDM symbols for CSI-RS according to a CSI-RS configuration may be given by the following table. More details may refer to Table 2.

| | Number of CSI reference signals configured | | |
| --- | --- | --- | --- |
| CSI-RS configuration | 1 or 2 OFDM symbol index | 4 OFDM symbol index | 8 OFDM symbol index |
| 0 | 5, 6 | 5, 6 | 5, 6 |
| 1 | 9, 10 | 9, 10 | 9, 10 |
| 2 | 9, 10 | 9, 10 | 9, 10 |
| 3 | 9, 10 | 9, 10 | 9, 10 |
| 4 | 12, 13 | 12, 13 | 12, 13 |
| 5 | 5, 6 | 5, 6 | |
| 6 | 9, 10 | 9, 10 | |
| 7 | 9, 10 | 9, 10 | |
| 8 | 9, 10 | 9, 10 | |
| 9 | 12, 13 | 12, 13 | |
| 10 | 5, 6 | | |
| 11 | 5, 6 | | |
| 12 | 9, 10 | | |
| 13 | 9, 10 | | |
| 14 | 9, 10 | | |
| 15 | 9, 10 | | |
| 16 | 9, 10 | | |
| 17 | 9, 10 | | |
| 18 | 12, 13 | | |
| 19 | 12, 13 | | |

As another example, even if the DRS transmission is moved to the SF other than the SF #0/#5 due to LBT, in order to enable CSI-RS/CSI-IM measurements, the CSI-RS configuration that may be allocated to the OFDM symbol indexes #5 and #6 to which the PSS/SSS (DRS) is allocated may be excluded when configuring the CSI-RS for an unlicensed band cell. That is, the CSI-RS for the unlicensed band cell may be configured using only the CSI-RS configuration not allocated to the OFDM symbol indexes #5 and #6. Specifically, in the unlicensed band cell, the CSI-RS configuration may be set to one of resourceConfig {1, 2, 3, 4, 6, 7, 8, 9, 12, 13, 14, 15, 16, 17, 18, 19} except resourceConfig{0, 5, 10, 11} or one of a subset of resourceConfig {1, 2, 3, 4, 6, 7, 8, 9, 12, 13, 14, 15, 16, 17, 18, 19}. A value of the CSI-RS configuration refers to Table 2. In the case of DRS alone transmission, the last two OFDM symbols of an SF are used as the CCA interval for LBT of next transmission, but when DRS and PDSCH are multiplexed in the SF except the SF #0/#5, the last two OFDM symbols of the SF may be used for PDSCH transmission and CSI-RS. Therefore, by configuring the CSI-RS configuration excluding the CSI-RS configuration, which may collide with the PSS/SSS (DRS), to an unlicensed band cell (e.g., LAA SCell), CSI-RS/CSI-IM measurement may be performed even when DRS and PDSCH are multiplexed. When the user equipment is configured to perform CSI-RS/CSI-IM measurements, the user equipment may assume that resourceConfig {0, 5, 10, 11} is not used for the CSI-RS/CSI-IM measurements. Thus, the user equipment may expect that the CSI-RS/CSI-IM configuration is set to one of resourceConfig {1, 2, 3, 4, 6, 7, 8, 9, 12, 13, 14, 15, 16, 17, 18, 19} or one of a subset of resourceConfig {1, 2, 3, 4, 6, 7, 8, 9, 12, 13, 14, 15, 16, 17, 18, 19}, and may perform CSI-RS/CSI-IM measurements.

As another example, when the user equipment recognizes that DRS and PDSCH are multiplexed in SF of an unlicensed band cell, the user equipment may not distinguish between the CSI-RS configuration for CSI-RS/CSI-IM (i.e., CSI-RS/CSI-IM configuration) and the CSI-RS (DRS) configuration with respect to the corresponding SF. Also, the user equipment performs RRM measurements and/or CSI measurements by overriding a CSI-RS configuration with the CSI-RS (DRS) configuration, that is, substituting the CSI-RS/CSI-IM configuration with the CSI-RS (DRS) configuration. Alternatively, the user equipment performs RRM measurements and/or CSI measurements by overriding the CSI-RS configuration with the CSI-RS/CSI-IM configuration, that is, substituting the CSI-RS (DRS) configuration with the CSI-RS/CSI-IM configuration. In the former case, the base station does not separately use the CSI-RS REs for CSI-RS/CSI-IM, which needed to be transmitted to the user equipment, and the user equipment measures the CSI-RS of the DRS to perform RRM measurements and/or CSI measurements without any additional RS overhead. In the latter case, the base station does not separately use the CSI-RS REs (DRS), which needed to be transmitted to the user equipment, and the user equipment measures the CSI-RS for CSI-RS/CSI-IM to perform RRM measurements and/or CSI measurements without any additional RS overhead.

As another example, when it is recognized by explicit signaling or implicit signaling that DRS (CSI-RS) is transmitted in SF configured for CSI-RS/CSI-IM transmission in the unlicensed band cell, the user equipment may not distinguish between the CSI-RS/CSI-IM configuration and the CSI-RS (DRS) configuration with respect to the corresponding SF. Also the user equipment a) performs RRM measurements and/or CSI measurements by overriding the CSI-RS/CSI-IM configuration with the CSI-RS (DRS) configuration, that is, substituting the CSI-RS/CSI-IM configuration with the CSI-RS (DRS) configuration or b) performs RRM measurements and/or CSI measurements by overriding the CSI-RS (DRS) with the CSI-RS/CSI-IM configuration, that is, substituting the CSI-RS (DRS) configuration with the CSI-RS/CSI-IM configuration.

In the case of a), the base station may transmit the DRS including the CSI-RS without transmitting the CSI-RS REs for the CSI-RS/CSI-IM to the user equipment. After receiving the DRS including the CSI-RS, the user equipment may measure the CSI-RS (DRS) to perform RRM measurements and/or CSI measurements without additional RS overhead. Specifically, if it is recognized by explicit signaling or implicit signaling that a DRS (CSI-RS) is transmitted in the SF configured for the CSI-RS/CSI-IM transmission, the user equipment may assume that CSI-RS (CSI-RS/CSI-IM) is not transmitted in the corresponding SF and measure CSI-RS (DRS) to perform RRM measurements and/or CSI measurements.

In the case of b), the base station may transmit CSI-RS REs for the CSI-RS/CSI-IM to the user equipment and may not transmit CSI-RS (DRS). The user equipment may measure CSI-RS (CSI-RS/CSI-IM) to perform RRM measurements and/or CSI measurements without additional RS overhead. Specifically, if it is recognized by explicit signaling or implicit signaling that a DRS (CSI-RS) is transmitted in the SF configured for the CSI-RS/CSI-IM transmission, the user equipment may assume that CSI-RS (DRS) is not transmitted in the corresponding SF and measure CSI-RS (CSI-RS/CSI-IM) to perform both RRM measurements and/or CSI measurements.

Next, a description will be given of a solution of a case where a transmission resource (e.g., RE) of the CSI-RS (DRS) and a transmission resource of the CSI-RS (CSI-RS/CSI-IM) collide with each other.

In Case 1), as shown in FIG. 21, when the DRS transmission is moved to the SF other than the SF #0 and #5 due to the LBT, the PSS/SSS/CRS/CSI-RS that configures the DRS is transmitted in the OFDM symbol index within the corresponding SF which is same as the OFDM symbols index within the SF #0/#5, and the CSI-RS is transmitted in the OFDM symbol index #9/#10 according to the CSI-RS configuration. In such a manner, when DRS is transmitted in SFs other than SF #0/#5 in addition to SF #0/#5, CSI measurements may be affected by a collision between CSI-RS (DRS) REs and CSI-RS REs for CSI-RS/CSI-IM measurements. In other words, in the SF where the DRS transmission is performed, if a collision between CSI-RS (DRS) REs and CSI-RS/RS for CSI-RS/CSI-IM measurements has occurred due to LBT, the CSI measurement is not performed or the measurement performance deteriorates, so that there may be a problem with the reliability of RRM measurement and CSI measurement. Therefore, an embodiment of in the present invention, even if the DRS transmission is moved to the SF other than the SF #0/#5 due to the LBT, a method of enabling RRM measurements for CSI-RS (DRS) and CSI measurements for CSI-RS/CSI-IM will be described and the method of ensuring measurement accuracy and reliability will be described.

1. CSI-RS (DRS) and CSI-RS/CSI-IM may be configured to have different resources (e.g., RE). Considering the case where the DRS is transmitted in the SF other than the SF (e.g., SF #0/#5) configured to be transmitted due to the LBT, CSI-RS (DRS) resources and CSI-RS/CSI-IM resources may be configured without overlapping. The base station may generate CSI-RS configuration information so that the CSI-RS (DRS) resource and the CSI-RS/CSI-IM resource do not overlap each other and notify CSI-RS configuration information to the user equipment, and may transmit CSI-RS (DRS) and CSI-RS/CSI-IM according to the CSI-RS configuration information to the user equipment. Accordingly, the user equipment may not expect CSI-RS (DRS) and CSI-RS/CSI-IM to be transmitted simultaneously in the same resource when detecting CSI-RS (DRS) and CSI-RS/CSI-IM. Also, the user equipment may detect CSI-RS (DRS) and CSI-RS/CSI-IM according to each CSI-RS configuration information. Under the assumption that resources for transmitting CSI-RS (DRS) and for transmitting CSI-RS/CSI-IM are different each other, the user equipment may detect CSI-RS (DRS) and CSI-RS/CSI-IM according to each CSI-RS configuration information.

2. Since CSI-RS (DRS) and CSI-RS/CSI-IM are configured independently, depending on the actual SF in which the DRS is transmitted, CSI-RS (DRS) and CSI-RS/CSI-IM may overlap in the same resource (e.g., RE) due to LBT. A method of detecting a CSI-RS (DRS) and a CSI-RS/CSI-IM when the CSI-RS (DRS) and the CSI-RS/CSI-IM collide with each other will be described.

2-1) the CSI-RS (DRS) (Scrambling) sequence may be generated according to the SF index (slot index) or the SF number (slot number) where the CSI-RS (DRS) is transmitted. That is, whether the CSI-RS (DRS) is transmitted in the SF #0/#5 or the SF other than the SF #0/#5, the CSI-RS (DRS) sequence may depend on the SF index (slot index) or SF number (slot number) where the DRS is transmitted. Accordingly, when the CSI-RS (DRS) and the CSI-RS/CSI-IM overlap in the same resource (hereinafter referred to as collision resources) in SF, the base station may select one of CSI-RS (DRS) and CSI-RS/CSI-IM and transmit it. The detection of the CSI-RS (DRS) and the CSI-RS/CSI-IM is performed using the CSI-RS sequence generated based on the current SF index (slot index). Therefore, regardless of which CSI-RS is transmitted in the collision resource, the user equipment may detect the CSI-RS on the collision resource using the CSI-RS sequence generated based on the current SF index (slot index). That is, the user equipment may detect the CSI-RS (DRS) or the CSI-RS/CSI-IM on the collision resource using the CSI-RS sequence generated based on the current SF index (slot index).

On the other hand, the user equipment assumes that one of the CSI-RS (DRS) and CSI-RS/CSI-IM is dropped depending on whether to perform detection of CSI-RS (DRS) or detection of CSI-RS/CSI-IM in the collision resource to perform a detection. That is, the user equipment performs RRM measurement and/or CSI measurement by performing detection of CSI-RS (DRS) and assumes that CSI-RS/CSI-IM is dropped. Conversely, the user equipment performs RRM measurement and/or CSI measurement by performing detection of CSI-RS/CSI-IM and assumes that CSI-RS (DRS) is dropped. In addition, the CRS sequence based on the SF index used for the SSS (DRS) (e.g., SF #0/#5) or the CRS sequence based on the current SF index where the DRS is transmitted may be applied to the CRS (DRS).

2-2) the CSI-RS (DRS) sequence may not be generated according to the SF index (slot index) or the SF number (slot number) where the DRS is transmitted. For example, the CSI-RS (DRS) sequence may depend on a fixed SF index, depend on the SF index used for the SSS (DRS) (e.g., SF #0 and SF #5), or depend on the SF index used for CRS (DRS). The CRS sequence based on the SF index used for the SSS (DRS) (e.g., SF #0/#5) or the CRS sequence based on the current SF index where the DRS is transmitted may be applied to the CRS (DRS). For example, in a case where the CSI-RS (DRS) sequence depends on the SF index (slot index) of the SSS (DRS), when DRS is transmitted in SF #0 to SF #4, based on SF #0 (slot #0/#1), a CSI-RS (DRS) sequence may be provided. On the other hand, when DRS is transmitted in SF #5 to #9, a CSI-RS (DRS) sequence may be provided based on SF #5 (slot #10/#11). Here, the fact that the CSI-RS sequence and the CRS sequence depend on the SF index (slot index) or are generated according to the SF index (slot index) may include the fact that the CSI-RS sequence and the CRS sequence are initialized based on the corresponding SF index (slot index).

When the CSI-RS (DRS) and the CSI-RS/CSI-IM are configured to be transmitted from the same resource (e.g., RE)(hereinafter referred to as collision resource) in the SF, the CSI-RS (DRS) sequence may not be generated according to the SF index (slot index) or SF number (slot number) where the DRS is transmitted, and the CSI-RS sequence for CSI-RS/CSI-IM may be generated according to the current SF index (slot index) or the current SF number (slot number). Accordingly, when CSI-RSs (e.g., CSI-RS (DRS) and CSI-RS/CSI-IM) having different purposes are configured to be transmitted in the same resource, the base station transmits only one of CSI-RSs.

As an example, in 3GPP TS 36. 211 V12. 6. 0, the CRI-RS sequence is generated by Equation 2. The initialization value of the CSI-RS sequence is given by Equation 3.

[Equation 2]
$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, N_{RB}^{max,DL} - 1$$

Here, $n_s$ represents a slot index in a radio frame, l represents an OFDM symbol index in the slot, $c(\cdot)$ represents a pseudo-random sequence, and NL represents the maximum number of RBs in the DL band. $c(\cdot)$ is initialized using the initialization value of Equation 3 at the beginning of each OFDM symbol.

$$c_{init} = 2^{10} \cdot (7 \cdot (n_s+1)+l+1) \cdot (2 \cdot N_{ID}^{CSI}+1) + 2 \cdot N_{ID}^{CSI} + N_{CP}$$

Here, $n_s$ represents a slot index in a radio frame, and l represents an OFDM symbol index in a slot. $N_{ID}^{CS}$ is configured by higher layers (e.g., RRC), and is the same as $N_{ID}^{cell}$ if not configured by higher layers. $N_{ID}^{cell}$ represents a physical cell ID. $N_{CP}$ is a value representing a CP type, 1 for a normal CP and 0 for an extended CP. The slot index $n_s$ in the radio frame has the following relationship with the SF index SF #.

TABLE 3

| SF # | 0 | | 1 | | 2 | | 3 | | 4 | | 5 | | 6 | | 7 | | 8 | | 9 | |
|---|---|---|---|---|---|---|---|---|---|---|---|---|---|---|---|---|---|---|---|---|
| $n_s$ | 0 | 1 | 2 | 3 | 4 | 5 | 6 | 7 | 8 | 9 | 10 | 11 | 12 | 13 | 14 | 15 | 16 | 17 | 18 | 19 |

Since the initialization value is determined based on each SF index in the 3GPP Rel-12CSI-RS sequence, $n_s$ in Equation 3 has a value of 0 to 19 according to the SF where the CSI-RS is transmitted.

On the other hand, the CSI-RS (DRS) sequence is not generated according to the SF index (or slot index) where the DRS is transmitted. For example, when the sequence of the CSI-RS (DRS) depends on the SF index (e.g., SF #0 and SF #5) used for the SSS (DRS), $n_s$ in Equation 3 has only a slot index corresponding to SF #0 or SF #5 according to the SF where the DRS is transmitted, as follows.

TABLE 4

| SF # | 0 | 1 | 2 | 3 | 4 | 5 | 6 | 7 | 8 | 9 |
|---|---|---|---|---|---|---|---|---|---|---|
| $n_s$ | 0 1 | 0 1 | 0 1 | 0 1 | 0 1 | 10 11 | 10 11 | 10 11 | 10 11 | 10 11 |

Therefore, when the CSI-RS is detected, the user equipment may distinguish the CSI-RSs for different purposes by using the SF index (slot index) used for initializing the sequence of the CSI-RS. For example, it is assumed that the user equipment performs detection process of the CSI-RS in SF #4. In this case, when the CSI-RS is detected using the CSI-RS sequence initialized to the slot index #8 or #9, the user equipment determines the detected CSI-RS as CSI-RS (CSI-RS/CSI-IM). On the other hand, when the CSI-RS is not detected using the CSI-RS sequence initialized to the slot index #8 or #9 but is detected using another sequence index (i.e., when the CSI-RS sequence does not depend on the SF index (slot index) of the current SF, or when the CSI-RS sequence is initialized using a value other than the SF index (slot index) of the current SF), the user equipment may determine the detected CSI-RS as CSI-RS (DRS).

FIG. 24 illustrates a downlink receiving process according to an embodiment of the present invention.

Referring to FIG. 24, a user equipment may detect a CSI-RS in a time unit #n on an unlicensed band cell (S2402). The time unit #n may be subframe #n or slot #n. Then, the user equipment may verify whether the detected CSI-RS sequence is used only for the CSI measurement by using the initialization value of the CSI-RS sequence of the CSI-RS (S2404). Here, when the index of the time unit #n is used for the initialization value of the CSI-RS sequence, the detected CSI-RS sequence may be used only for CSI measurements. On the other hand, when the index of the time unit #n is not used in the initialization value of the CSI-RS sequence, the CSI-RS sequence may be used for DRS. If the index of the time unit #n is not used in the initialization value of the CSI-RS sequence, predetermined value may be used instead of the index of the time unit #n. the predetermined value may be a specific SF index (or slot index), may be an SF index (or slot index) used for the SSS (DRS), may be an SF index (or slot index) used for the CRS (DRS), or may be a slot index $n_s$ in Table 4. When CSI-RS is used for DRS, the CSI-RS may be used for CSI measurements and/or RRM measurements. More specifically, when the time unit #n is not the subframe #0 or #5 and the slot index of the subframe #0 or #5 is used for the initialization value of the CSI-RS sequence, CSI-RS may be used for DRS.

The initialization value of the CSI-RS sequence may be given by the following Equation:

$$c_{init}=2^{10} \cdot (7 \cdot (n_s+1)+l+1) \cdot (2 \cdot N_{ID}^{CSI}+1)+2 \cdot N_{ID}^{CSI}+N_{CP}$$

Here, l represents the OFDM symbol index within the slot, $N_{ID}^{CS}$ represents a value configured by higher layers or a physical cell identifier, $N_{CP}$ has 0 or 1 depending on the CP (Cyclic Prefix) type, and $n_s$ may have an index of the time unit #n according to the use of the CSI-RS, or has predetermined value. The predetermined value may be a specific SF index (or slot index), may be an SF index (or slot index) used for the SSS (DRS), may be an SF index (or slot index) used for the CRS (DRS), or may be a slot index $n_s$ in Table 4.

On the other hand, in the view point of the base station, DRS transmission for RRM measurement may be prioritized, so that CSI-RS (DRS) may be transmitted at the collision resource. In a case where a collision issue occurs, if there is explicit signaling or implicit signaling for the presence of DRS (e.g., including blind detection of DRS), the user equipment may assume that the CSI-RS (DRS) is transmitted at the collision resource. Accordingly, the user equipment may perform RRM measurement and/or CSI measurement by performing detection of CSI-RS (DRS) according to the CSI-RS (DRS) sequence. Or, in a case where a collision issue occurs, if there is no explicit signaling or implicit signaling for the presence of DRS (e.g., including blind detection of DRS), the user equipment may perform CSI measurement by performing detection of CSI-RS/CSI-IM according to the CSI sequence with respect to the CSI-RS/CSI-IM configuration, that is, the CSI sequence depending on each SF index.

Conversely, in the view point of the base station, since CSI-RS transmission for CSI-RS/CSI-IM measurement may be prioritized, CSI-RS (CSI-RS/CSI-IM) may be transmitted at the collision resource. In a case where a collision issue occurs on the same resource, if there is explicit signaling or implicit signaling for the presence of DRS (e.g., including blind detection of DRS), a user equipment receiving a CSI-RS (DRS) configuration and a CSI-RS/CSI-IM configuration from a base station may assume that a CSI-RS (DRS) is transmitted at a collision resource. Accordingly, the user equipment may perform RRM measurement and/or CSI measurement by performing detection of CSI-RS (DRS) according to the CSI-RS (DRS) sequence. Or, in a case where a collision issue occurs, if there is no explicit signaling or implicit signaling for the presence of DRS (e.g., including blind detection of DRS), the user equipment may perform CSI measurement by performing detection of CSI-RS/CSI-IM according to the CSI sequence with respect to the CSI-RS/CSI-IM configuration, that is, the CSI sequence depending on each SF index.

Meanwhile, the number of antenna ports of CSI-RS (DRS) and the number of antenna ports of CSI-RS/CSI-IM may be different from each other. In this case, if CSI-RS configurations are set to be equal, REs mapped to CSI-RS (DRS) and CSI-RS/CSI-IM in time and frequency resources may overlap each other. At this time, the base station may be configured to transmit a CSI-RS (DRS) with a small number of antenna ports at a collision resource. In a case where a collision issue occurs on the same resource, if there is explicit signaling or implicit signaling for the presence of DRS (e.g., including blind detection of DRS), since the number of antenna ports for the CSI-RS (DRS) and the number of antenna ports for CSI-RS/CSI-IM may be known through the base station configuration, a user equipment receiving a CSI-RS (DRS) configuration and a CSI-RS/CSI-IM configuration from a base station may assume that a CSI-RS (DRS) is transmitted at a collision resource. Accordingly, the user equipment may perform RRM measurement and/or CSI measurement by performing detection of CSI-RS (DRS) according to the CSI-RS (DRS) sequence.

The number of antenna ports of CSI-RS (DRS) and the number of antenna ports of CSI-RS/CSI-IM may be different from each other. In this case, if CSI-RS configurations are set to be equal, REs mapped to CSI-RS (DRS) and CSI-RS/CSI-IM in time and frequency resources may overlap each other. At this time, the base station may be configured to transmit the CSI-RS of the CSI-RS/CSI-IM with a larger number of antenna ports at a collision resource. In a case where a collision issue occurs on the same resource, if there is explicit signaling or implicit signaling for the presence of DRS (e.g., including blind detection of DRS), since the number of CSI-RS ports for transmitting DRS is different from the number of CSI-RS ports that are periodic or aperiodic, a user equipment receiving a CSI-RS (DRS) configuration and a CSI-RS/CSI-IM configuration from a base station may assume that a CSI-RS (CSI-RS/CSI-IM) is transmitted at a collision resource. Accordingly, the user equipment may perform RRM measurement and/or CSI measurement by performing detection of CSI-RS (CSI-RS/CSI-IM) according to the CSI-RS (CSI-RS/CSI-IM) sequence.

Case 2) if CSI-RS Configured for DRS is not Configured in Unlicensed Band Cell

When the CSI-RS configuration is not configured in the DRS, the OFDM symbol index #9/#10 for the CSI-RS configured for the DRS is not used. Therefore, the CSI-RS configuration within the DMTC in the unlicensed band cell may be configured only as the CSI-RS configuration using the OFDM symbol #9/#10. In this case, in addition to the CSI-RS/CSI-IM measurement, the DRS function may be additionally obtained by detecting the CSI-RS transmitted in the OFDM symbol index #9/#10. The CSI-RS configured for DRS and the CSI-RS/CSI-IM configured for CSI measurement are configured independently. Accordingly, in order to enable CSI-RS/CSI-IM measurements even when DRS transmissions are moved to SFs other than SF #0/#5 due to LBT, the base station may configure the CSI-RS/CSI-IM configuration and the CSI-RS (DRS) configuration identically. Specifically, in the unlicensed band cell, the CSI-RS configuration, the MeasCSI-RS-Config which is the RRC parameter, may be set to one of resourceConfig {1, 2, 3, 6, 7, 8, 12, 13, 14, 15, 16, 17} except resourceConfig {0, 4, 5, 9, 10, 11, 18, 19} or one of a subset of resourceConfig {1, 2, 3, 6, 7, 8, 12, 13, 14, 15, 16, 17}. A value of the CSI-RS configuration refers to Table 2. By configuring the CSI-RS/CSI-IM configuration as same as the CSI-RS (DRS) configuration, the collision of CSI-RS/CSI-IM and PSS/SSS (DRS) may be prevented and CSI measurement may be performed even when simultaneous transmission of PDSCH and DRS is performed. Thus, when the user equipment is configured to perform CSI-RS/CSI-IM measurements, the user equipment may assume that resourceConfig {0, 4, 5, 9, 10, 11, 18, 19} is not used for the CSI-RS/CSI-IM measurements. Thus, the user equipment may perform CSI-RS/CSI-IM measurements with the expectation that the CSI-RS/CSI-IM configuration may be set to one of resourceConfig {1, 2, 3, 6, 7, 8, 12, 13, 14, 15, 16, 17} or one of a subset of resourceConfig {1, 2, 3, 6, 7, 8, 12, 13, 14, 15, 16, 17}.

As another example, even if the DRS transmission is moved to SFs other than SF #0/#5 due to LBT, in order to enable CSI-RS/CSI-IM measurements, the CSI-RS configuration that may be allocated to the OFDM symbol indexes #5 and #6 to which the PSS/SSS (DRS) is allocated may be excluded when configuring the CSI-RS for an unlicensed band cell. That is, the CSI-RS for the unlicensed band cell may be configured using only the CSI-RS configuration not allocated to the OFDM symbol indexes #5 and #6. Specifically, in the unlicensed band cell, the CSI-RS configuration may be set to one of resourceConfig {1, 2, 3, 4, 6, 7, 8, 9, 12, 13, 14, 15, 16, 17, 18, 19} except resourceConfig {0, 5, 10, 11} or one of a subset of resourceConfig {1, 2, 3, 4, 6, 7, 8, 9, 12, 13, 14, 15, 16, 17, 18, 19}. A value of the CSI-RS configuration refers to Table 2. In the case of DRS alone transmission, as shown in FIG. 21, the last two OFDM symbols in one of an SF are used as the CCA interval for LBT of the next transmission. However, if DRS and PDSCH are multiplexed in SF except SF #0/#5, the last two OFDM symbols may be used for PDSCH transmission and CSI-RS RE. Therefore, by configuring the CSI-RS configuration excluding the CSI-RS configuration, which may collide with the PSS/SSS (DRS), to an unlicensed band cell (e.g., LAAS-Cell), CSI-RS/CSI-IM measurement may be performed even when DRS and PDSCH are multiplexed. When the user equipment is configured to perform CSI-RS/CSI-IM measurements, the user equipment may assume that resourceConfig {0, 5, 10, 11} is not used for the CSI-RS/CSI-IM measurements. Thus, the user equipment may expect that the CSI-RS/CSI-IM configuration is set to one of resourceConfig {1, 2, 3, 4, 6, 7, 8, 9, 12, 13, 14, 15, 16, 17, 18, 19} or one of a subset of resourceConfig {1, 2, 3, 4, 6, 7, 8, 9, 12, 13, 14, 15, 16, 17, 18, 19}, and may perform CSI-RS/CSI-IM measurements.

FIG. 25 illustrates a configuration of a user equipment and a base station according to an embodiment of the present invention. The embodiment of the present invention, the user equipment may be implemented by various types of wireless communication devices or computing devices that are guaranteed to be portable and mobility. The user equipment may be refered to as a station (STA), an Mobile Subscriber (MS), or the like. In the embodiment of present invention, the base station may control and manage a cell (eg, macrocell, femtocell, picosell, etc.) corresponding to a service area and perform function such as transmitting signal, designating channel, monitoring channel, self-diagnosis, relay. The base station may be referred to as an evolved NodeB(eNB), an access point (AP), or the like.

Referring to FIG. 25, the user equipment 100 may include a processor 110, a communication module 120, a memory 130, a user interface unit 140, and a display unit 150.

The processor 110 may execute various commands or programs according to an embodiment of the present invention and process data in the user equipment 100. Further, the processor 100 may control all operations of the respective units of the user equipment 100 and control data transmission/reception among the units. For example, the processor 110 may receive/process the downlink signal according to the proposal of the present invention. (See FIGS. 1 to 24.)

The communication module 120 may be an integrated module that performs mobile communication using a mobile communication network and wireless LAN access using a wireless LAN. To this end, the communication module 120 may include a plurality of network interface cards such as cellular communication interface cards 121 and 122 and a wireless LAN interface card 123 in an internal or external type. In the figure, the communication module 120 is illustrated as the integrated module, but the respective network interface cards may be independently disposed according to a circuit configuration or a purpose unlike the figure.

The cellular communication interface card 121 transmits/receives a radio signal to/from at least one of a base station 200, an external device, and a server by using the mobile communication network and provides a cellular communication service at a first frequency band based on a command of the processor 110. The cellular communication interface card 121 may include at least one NIC module using an LTE-licensed frequency band. The cellular communication interface card 122 transmits/receives the radio signal to/from at least one of the base station 200, the external device, and the server by using the mobile communication network and provides the cellular communication service at a second frequency band based on the command of the processor 110. The cellular communication interface card 122 may include at least one NIC module using an LTE-unlicensed frequency band. For example, the LTE-unlicensed frequency band may be a band of 2.4 GHz or 5 GHz.

The wireless LAN interface card 123 transmits/receives the radio signal to/from at least one of the base station 200, the external device, and the server through wireless LAN access and provides a wireless LAN service at the second frequency band based on the command of the processor 110. The wireless LAN interface card 123 may include at least one NIC module using a wireless LAN frequency band. For example, the wireless LAN frequency band may be an unlicensed radio band such as the band of 2.4 GHz or 5 GHz.

The memory 130 stores a control program used in the user equipment 100 and various resulting data. The control program may include a program required for the user equipment 100 to perform wireless communication with at least one of the base station 200, the external device, and the server. The user interface 140 includes various types of input/output means provided in the user equipment 100. The display unit 150 outputs various images on a display screen.

Further, the base station 200 according to the exemplary embodiment of the present invention may include a processor 210, a communication module 220, and a memory 230.

The processor 210 may execute various commands or programs according to the present invention and process data in the base station 200. Further, the processor 210 may control all operations of the respective units of the base station 200 and control data transmission/reception among the units. For example, the processor 210 may transmit/process the downlink transmission signal according to the proposal of the present invention. (See FIGS. 1 to 24.)

The communication module 220 may be an integrated module that performs the mobile communication using the mobile communication network and the wireless LAN access using the wireless LAN like the communication module 120 of the user equipment 100. To this end, the communication module 120 may include a plurality of network interface cards such as cellular communication interface cards 221 and 222 and a wireless LAN interface card 223 in the internal or external type. In the figure, the communication module 220 is illustrated as the integrated module, but the respective network interface cards may be independently disposed according to the circuit configuration or the purpose unlike the figure.

The cellular communication interface card 221 transmits/receives the radio signal to/from at least one of the user equipment 100, the external device, and the server by using the mobile communication network and provides the cellular communication service at the first frequency band based on a command of the processor 210. The cellular communication interface card 221 may include at least one NIC module using the LTE-licensed frequency band. The cellular communication interface card 222 transmits/receives the radio signal to/from at least one of the user equipment 100, the external device, and the server by using the mobile communication network and provides the cellular communication service at the second frequency band based on the command of the processor 210. The cellular communication interface card 222 may include at least one NIC module using the LTE-unlicensed frequency band. The LTE-unlicensed frequency band may be the band of 2.4 GHz or 5 GHz.

The wireless LAN interface card 223 transmits/receives the radio signal to/from at least one of the user equipment 100, the external device, and the server through the wireless LAN access and provides the wireless LAN service at the second frequency band based on the command of the processor 210. The wireless LAN interface card 223 may include at least one NIC module using the wireless LAN frequency band. For example, the wireless LAN frequency band may be the unlicensed radio band such as the band of 2.4 GHz or 5 GHz.

In the figure, blocks of the user equipment and the base station logically divide and illustrate elements of the device. The elements of the device may be mounted as one chip or a plurality of chips according to design of the device. Further, some components of the user equipment 100, that is to say, the user interface 140 and the display unit 150 may be selectively provided in the user equipment 100. Further, some components of the base station 200, that is to say, the wireless LAN interface 223, and the like may be selectively provided in the base station 200. The user interface 140 and the display unit 150 may be additionally provided in the base station 200 as necessary.

The method and the system of the present invention are described in association with the specific embodiments, but some or all of the components and operations of the present invention may be implemented by using a computer system having a universal hardware architecture.

The description of the present invention is used for illustration and those skilled in the art will understand that the present invention can be easily modified to other detailed forms without changing the technical spirit or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

The present invention is applicable to various communication devices used in a wireless communication system (e.g., a station using an unlicensed band communication, an access point, or a station using a cellular communication, a base station, etc.).

What is claimed is:

1. A user equipment used in a cellular wireless communication system, the user equipment comprising:
a wireless communication module; and
a processor,
wherein the processor is configured to:
receive Channel State Information Reference Signal (CSI-RS) configuration information indicating one of plurality of CSI-RS configuration information included in a CSI-RS configuration information set for a downlink cell from a base station, and
receive CSI-RS in the downlink cell according to the CSI-RS configuration information from the base station,
wherein when the downlink cell operates in a licensed band, the CSI-RS configuration information set is a first CSI-RS configuration information set including one or more first CSI-RS configuration information related to Orthogonal Frequency Division Multiplexing (OFDM) symbols #5/#6, one or more second CSI-RS configuration information related to OFDM symbols #9/#10, and one or more third CSI-RS configuration information related to OFDM symbols #12/#13,
wherein when the downlink cell operates in an unlicensed band, the CSI-RS configuration information set is a second CSI-RS configuration information set,
wherein the second CSI-RS configuration information set is part of the first CSI-RS configuration set and does not comprise the one or more third CSI-RS configuration information.

2. The user equipment of claim 1, wherein the second CSI-RS configuration information set does not comprise the one or more first CSI-RS configuration information.

3. The user equipment of claim 1, wherein the first CSI-RS configuration information set is a CSI-RS configuration {0, 1, 2, 3, 4, 5, 6, 7, 8, 9, 10, 11, 12, 13, 14, 15, 16, 17, 18, 19} and the second CSI-RS configuration information set is a CSI-RS configuration {1, 2, 3, 6, 7, 8, 12, 13, 14, 15, 16, 17}.

4. The user equipment of claim 3, wherein the OFDM symbols for CSI-RS according to a CSI-RS configuration information is given by the following Table

| CSI-RS configuration | Number of CSI reference signals configured | | |
|---|---|---|---|
| | 1 or 2 OFDM symbol index | 4 OFDM symbol index | 8 OFDM symbol index |
| 0 | 5, 6 | 5, 6 | 5, 6 |
| 1 | 9, 10 | 9, 10 | 9, 10 |
| 2 | 9, 10 | 9, 10 | 9, 10 |
| 3 | 9, 10 | 9, 10 | 9, 10 |
| 4 | 12, 13 | 12, 13 | 12, 13 |
| 5 | 5, 6 | 5, 6 | |
| 6 | 9, 10 | 9, 10 | |
| 7 | 9, 10 | 9, 10 | |
| 8 | 9, 10 | 9, 10 | |
| 9 | 12, 13 | 12, 13 | |
| 10 | 5, 6 | | |
| 11 | 5, 6 | | |
| 12 | 9, 10 | | |
| 13 | 9, 10 | | |
| 14 | 9, 10 | | |
| 15 | 9, 10 | | |
| 16 | 9, 10 | | |
| 17 | 9, 10 | | |
| 18 | 12, 13 | | |
| 19 | 12, 13. | | |

5. The user equipment of claim 1, wherein when the downlink cell operates in the unlicensed band and the CSI-RS is configured to Discovery Reference Signal (DRS), the processor is further configured to perform a Radio Resource Management (RRM) measurement using the CSI-RS.

6. The user equipment of claim 5, wherein an index of a time unit #n is not used for an initialization value of a CSI-RS sequence of the CSI-RS used for the DRS.

7. The user equipment of claim 6, wherein the time unit #n is a subframe #n or a slot #n.

8. The user equipment of claim 7, wherein the initialization value of the CSI-RS sequence is given by the following Equation, $$c_{init}=2^{10}\cdot(7\cdot(n_s+1)+l+1)\cdot(2\cdot N_{ID}^{CSI}+1)+2\cdot N_{ID}^{CSI}+N_{CP}$$

Here, $l$ represents the OFDM symbol within a slot,
$N_{ID}^{CSI}$ represents a value configured by higher layers or a physical cell identifier,
$N_{CP}$ has 0 or 1 depending on a Cyclic Prefix (CP) type, and
$n_s$ has the index of the time unit #n or has another predetermined value according to the use of the CSI-RS.

9. A method of a base station to transmit a downlink signal in a cellular communication system, the method comprising:
selecting Channel State Information Reference Signal (CSI-RS) configuration information for a downlink cell from a CSI-RS configuration information set;
transmitting the selected CSI-RS configuration information to a user equipment; and
transmitting CSI-RS to the user equipment in the downlink cell according to the selected CSI-RS configuration information,
wherein each CSI-RS configuration information represents Orthogonal Frequency Division Multiplexing (OFDM) symbols for CSI-RS in a subframe including OFDM symbols #0 to #13,
wherein when the downlink cell operates in a licensed band, the CSI-RS configuration information set is a first CSI-RS configuration information set including one or more first CSI-RS configuration information related to OFDM symbols #5/#6, one or more second CSI-RS configuration information related to OFDM symbols #9/#10, and one or more third CSI-RS configuration information related to OFDM symbols #12/#13,
wherein when the downlink cell operates in an unlicensed band, the CSI-RS configuration information set is a second CSI-RS configuration information set,
wherein the second CSI-RS configuration information set is part of the first CSI-RS configuration set and does not comprise the one or more third CSI-RS configuration information.

10. The method of claim 9, wherein the second CSI-RS configuration information set does not comprise the one or more first CSI-RS configuration information.

11. The method of claim 9, wherein the first CSI-RS configuration information set is a CSI-RS configuration {0, 1, 2, 3, 4, 5, 6, 7, 8, 9, 10, 11, 12, 13, 14, 15, 16, 17, 18, 19} and the second CSI-RS configuration information set is a CSI-RS configuration {1, 2, 3, 6, 7, 8, 12, 13, 14, 15, 16, 17}.

12. The method of claim 11, wherein the OFDM symbols for the CSI-RS according to the CSI-RS configuration information is given by the following Table

| CSI-RS configuration | Number of CSI reference signals configured | | |
|---|---|---|---|
| | 1 or 2 OFDM symbol index | 4 OFDM symbol index | 8 OFDM symbol index |
| 0 | 5, 6 | 5, 6 | 5, 6 |
| 1 | 9, 10 | 9, 10 | 9, 10 |
| 2 | 9, 10 | 9, 10 | 9, 10 |
| 3 | 9, 10 | 9, 10 | 9, 10 |
| 4 | 12, 13 | 12, 13 | 12, 13 |
| 5 | 5, 6 | 5, 6 | |
| 6 | 9, 10 | 9, 10 | |
| 7 | 9, 10 | 9, 10 | |
| 8 | 9, 10 | 9, 10 | |
| 9 | 12, 13 | 12, 13 | |
| 10 | 5, 6 | | |
| 11 | 5, 6 | | |
| 12 | 9, 10 | | |
| 13 | 9, 10 | | |
| 14 | 9, 10 | | |
| 15 | 9, 10 | | |
| 16 | 9, 10 | | |
| 17 | 9, 10 | | |
| 18 | 12, 13 | | |
| 19 | 12, 13. | | |

13. The method of claim 9, wherein when the downlink cell operates in the unlicensed band and the CSI-RS is configured to DRS, the transmitting the CSI-RS comprises transmitting the CSI-RS to the user equipment so that the user equipment performs a Radio Resource Management (RRM) measurement using the CSI-RS.

14. The method of claim 13, wherein the transmitting the CSI-RS comprises transmitting the CSI-RS using an initialization value of a CSI-RS sequence for the CSI-RS on the unlicensed band, and
wherein an index of a time unit #n is not used for the initialization value of a CSI-RS sequence of the CSI-RS used for the DRS.

15. The method of claim 14, wherein the time unit #n is a subframe #n or a slot #n.

16. The method of claim 15, wherein the initialization value of the CSI-RS sequence is given by the following Equation.

$$c_{init}=2^{10}\cdot(7\cdot(n_s+1)+l+1)\cdot(2\cdot N_{ID}^{CSI}+1)+2\cdot N_{ID}^{CSI}+N_{CP}$$

Here, l represents the OFDM symbol within a slot,
$N_{ID}^{CSI}$ represents a value configured by higher layers or a physical cell identifier,
$N_{CP}$ has 0 or 1 depending on a Cyclic Prefix (CP) type, and
$n_s$ has the index of the time unit #n or has another predetermined value according to the use of the CSI-RS.

17. A base station used in a cellular wireless communication system, the base station comprising:
a wireless communication module; and
a processor,
wherein the processor is configured to select Channel State Information Reference Signal (CSI-RS) configuration information for a downlink cell from a CSI-RS configuration information set,
transmit the selected CSI-RS configuration information to a user equipment, and
transmit CSI-RS to the user equipment in the downlink cell according to the selected CSI-RS configuration information,
wherein each CSI-RS configuration information represents Orthogonal Frequency Division Multiplexing (OFDM) symbols for CSI-RS in a subframe including OFDM symbols #0 to #13,
wherein when the downlink cell operates in a licensed band, the CSI-RS configuration information set is a first CSI-RS configuration information set including one or more first CSI-RS configuration information related to OFDM symbols #5/#6, one or more second CSI-RS configuration information related to OFDM symbols #9/#10, and one or more third CSI-RS configuration information related to OFDM symbols #12/#13,
wherein when the downlink cell operates in an unlicensed band, the CSI-RS configuration information set is a second CSI-RS configuration information set,
wherein the second CSI-RS configuration information set is part of the first CSI-RS configuration set and does not comprise the one or more third CSI-RS configuration information.

18. The base station of claim 17, wherein the second CSI-RS configuration information set does not comprise the one or more first CSI-RS configuration information.

19. The base station of claim 17, wherein the first CSI-RS configuration information set is a CSI-RS configuration {0, 1, 2, 3, 4, 5, 6, 7, 8, 9, 10, 11, 12, 13, 14, 15, 16, 17, 18, 19} and the second CSI-RS configuration information set is a CSI-RS configuration {1, 2, 3, 6, 7, 8, 12, 13, 14, 15, 16, 17}.

20. The base station of claim 19, wherein the OFDM symbols for the CSI-RS according to the CSI-RS configuration information is given by the following Table

| CSI-RS configuration | Number of CSI reference signals configured | | |
|---|---|---|---|
| | 1 or 2 OFDM symbol index | 4 OFDM symbol index | 8 OFDM symbol index |
| 0 | 5, 6 | 5, 6 | 5, 6 |
| 1 | 9, 10 | 9, 10 | 9, 10 |
| 2 | 9, 10 | 9, 10 | 9, 10 |
| 3 | 9, 10 | 9, 10 | 9, 10 |
| 4 | 12, 13 | 12, 13 | 12, 13 |
| 5 | 5, 6 | 5, 6 | |
| 6 | 9, 10 | 9, 10 | |
| 7 | 9, 10 | 9, 10 | |
| 8 | 9, 10 | 9, 10 | |
| 9 | 12, 13 | 12, 13 | |
| 10 | 5, 6 | | |
| 11 | 5, 6 | | |
| 12 | 9, 10 | | |
| 13 | 9, 10 | | |
| 14 | 9, 10 | | |
| 15 | 9, 10 | | |
| 16 | 9, 10 | | |
| 17 | 9, 10 | | |
| 18 | 12, 13 | | |
| 19 | 12, 13. | | |

\* \* \* \* \*